US012746580B2

(12) United States Patent
Balthasar

(10) Patent No.: US 12,746,580 B2
(45) Date of Patent: Sep. 29, 2026

(54) APPARATUS FOR ILLUMINATING MATTER

(71) Applicant: Tomra Sorting GmbH, Mülheim-Kärlich (DE)

(72) Inventor: Dirk Balthasar, Boppard (DE)

(73) Assignee: Tomra Sorting GmbH, Mülheim-Kärlich (DE)

( * ) Notice: Subject to any disclaimer, the term of this patent is extended or adjusted under 35 U.S.C. 154(b) by 0 days.

(21) Appl. No.: 18/715,364

(22) PCT Filed: Dec. 6, 2022

(86) PCT No.: PCT/EP2022/084668
§ 371 (c)(1), (2) Date: May 31, 2024

(87) PCT Pub. No.: WO2023/104834
PCT Pub. Date: Jun. 15, 2023

(65) Prior Publication Data

US 2025/0018433 A1 Jan. 16, 2025

(30) Foreign Application Priority Data

Dec. 7, 2021 (EP) .................................... 21212914

(51) Int. Cl.
*B07C 5/342* (2006.01)
*G01N 21/27* (2006.01)

(52) U.S. Cl.
CPC ............ *B07C 5/342* (2013.01); *G01N 21/27* (2013.01); *G01N 2201/105* (2013.01)

(58) Field of Classification Search
CPC ...... B07C 5/342; G01N 21/27; G01N 21/276; G01N 2021/845; G01N 2021/8835; G01N 2201/1087

(Continued)

(56) References Cited

U.S. PATENT DOCUMENTS 5,692,621 A 12/1997 Davis et al.
9,575,005 B2 2/2017 Balthasar et al.
(Continued)

FOREIGN PATENT DOCUMENTS

IN 201617015100 A 8/2016
JP H09129018 A * 5/1997
(Continued)

OTHER PUBLICATIONS

Kazuhiro; Takahashi, "Laser Device" (English Translation), Dec. 14, 2015, worldwide.espacenet.com (Year: 2015).*
(Continued)

*Primary Examiner* — Molly K Devine
(74) *Attorney, Agent, or Firm* — Buchanan Ingersoll & Rooney PC

(57) ABSTRACT

We provide an apparatus for detecting matter comprising: An irradiation arrangement adapted to emit one of a first and a second set of illumination beams towards a detection zone where the matter is provided. A detection system receives and analyzes light reflected, emitted and/or scattered by matter in the detection zone. A switching device comprising a carrier movable between a first position, wherein the only the first illumination device in an active illumination position, and a second position wherein only said second illumination device in said active illumination position, and wherein said irradiation arrangement is configured to emit an illumination beam only from the one of said first and second illumination devices arranged in said active illumination position and an actuator for physically moving said carrier from said first position to said second position based on the condition of said first illumination device and/or in response to user-initiated input.

13 Claims, 9 Drawing Sheets

(58) Field of Classification Search
USPC .................................................. 209/577, 580
See application file for complete search history.

(56) References Cited

U.S. PATENT DOCUMENTS

| | | | | |
|---|---|---|---|---|
| 9,785,851 | B1 | 10/2017 | Torek et al. | |
| 2014/0362382 | A1 | 12/2014 | Balthasar et al. | |
| 2016/0252461 | A1* | 9/2016 | Balthasar ............... | G01N 21/85<br>356/445 |
| 2016/0263624 | A1* | 9/2016 | Balthasar ............... | G01N 21/85 |
| 2020/0114395 | A1* | 4/2020 | Boudjedra ............ | B07C 5/3425 |
| 2023/0213443 | A1 | 7/2023 | Balthasar et al. | |

FOREIGN PATENT DOCUMENTS

| | | | |
|---|---|---|---|
| JP | 2001125199 | A | 5/2001 |
| JP | 2001201431 | A | 7/2001 |
| JP | 2003215045 | A | 7/2003 |
| JP | 2015225992 | A | 12/2015 |
| JP | 2016540996 | A | 12/2016 |
| JP | 2019200089 | A | 11/2019 |
| JP | 2020179355 | A | 11/2020 |

OTHER PUBLICATIONS

Koitabashi; Masanobu, "Light Source Device" (English Translation), May 16, 1997, worldwide.espacenet.com (Year: 1997).*

Gundupalli et al.,"A review on automated sorting of source-separated municipal solid waste for recycling", Waste Management, vol. 60, Feb. 2017, 56-74, XP055551300.

International Search Report (PCT/ISA/210) and Written Opinion (PCT/ISA/237) mailed on Jan. 20, 2023, by the European Patent Office as the International Searching Authority for International Application No. PCT/EP2022/084668. (13 pages).

Extended European Search Report dated May 9, 2022, issued by the European Patent Office in corresponding European Application No. 21212914.2. (10 pages).

Japanese Office Action dated Jul. 27, 2026, issued in corresponding Japanese Patent Application No. 2024-532742, with English translation (11 pages).

Office Action issued on Jun. 17, 2026, by the Intellectual Property India, Government of India in corresponding Indian Patent Application No. 202427043375, and an English Translation of the Office Action. (8 pages).

* cited by examiner

APPARATUS FOR ILLUMINATING MATTER

FIELD OF THE INVENTION

The present invention relates to an apparatus for detecting matter and more specifically to such an apparatus comprising a spectroscopy system and/or a laser triangulation system and an adjustable illumination.

BACKGROUND ART

Throughout a wide range of industries identification, detection, classification and sorting of various objects are frequently required and desired.

In its simplest form, manual identification of objects by a person may be employed to advantage when a limited number of objects are to be identified, sorted and classified. The person in question may then, based on his/her knowledge identify and classify the objects concerned. This type of manual identification is however monotonous and prone to errors. Also, the experience level of the operator will significantly influence the results of the operation performed by the operator. Moreover, manual identification of the above kind suffers from low identification speeds.

In industry, identification, sorting and classification of bulk objects is therefore often performed by machines where the bulk objects are supplied in form of a continuous object stream. Such machines are generally faster than an operator and can operate for longer periods of time, hence offering an enhanced overall throughput. Machines of this kind are for instance used in agriculture for fruits and vegetables, and in recycling for identifying and sorting objects and materials that are to be recycled.

Machines of the above kind generally has some form of sensor that is used for identifying the objects of interest. For instance, an optical sensor in form of a spectral sensor may be employed to determine the quality of harvested fruits and vegetables. Similarly, a spectral sensor may be employed to determine the material of objects that are to be recycled.

In systems of this kind it is of interest to minimise the down-time, i.e. the time the machine is not in use e.g. due to maintenance or adaptation.

US 2014/362382 A1 discloses an apparatus for detecting matter comprising a first and a second light source, the light sources being configured to emit a respective beam, wherein the apparatus is arranged such that the first and second light beams converge towards matter to be detected. The light beams, when they fall on the matter to be detected, are completely overlapping.

JP 2015 225992 A discloses a laser device comprising a plurality of laser light source units and a drive unit to move an arbitrary one of the plurality of light source units to a predetermined position. A light source control unit makes the light source unit moved to the predetermined position emit light.

Gudupalli, S. P. et al: "A review on automated sorting of source-separated municipal waste for recycling", Waste Management, Vol. 60 (2017): 56-74 is a review of physical processes, sensors, and actuators used as well as control and autonomy related issues in the area of automated sorting and recycling of source-separated municipal solid waste.

SUMMARY OF THE INVENTION

In view of that stated above, an object of the present invention is to provide an apparatus for detecting matter which is has an arrangement that provides an illumination system with less down-time.

Another object is to provide such an apparatus enabling a more flexible illumination system tailored for different tasks.

To achieve at least one of the above objects, and also other objects that will be evident from the following description, an apparatus having the features defined in claim 1 is provided according to the present invention. Preferred variants of the apparatus will be evident from the dependent claims.

More specifically, according to a first aspect there is provided according to the present invention an apparatus for detecting matter, which comprises:

- an irradiation arrangement comprising a first illumination device adapted to emit a first set of illumination beams and a second illumination device adapted to emit a second set of illumination beams,
- a scanning element,
- an optical arrangement, adapted to receive and direct at least one of said first and second sets of illumination beams towards said scanning element,
- wherein the scanning element is configured to redirect only one of said first and second sets of illumination beams towards a first detection zone through which the matter is provided,
- a detector system including at least one sensor arrangement adapted to receive and analyse optical radiation which optical radiation is reflected, emitted and/or scattered by matter in the first detection zone, in response to said matter being irradiated by one of said first and second set of illumination beams. The irradiation arrangement further comprises an active illumination position and a least one in-active illumination position, and an automated or semiautomated switching device comprising:
  - a carrier having a first receiving portion for receiving and holding said first illumination device, and a second receiving portion for receiving and holding said second illumination device, and wherein said carrier is movable between a first position, wherein said first receiving portion holds said first illumination device in said active illumination position and said second receiving portion holds said second illumination device in one of said at least one in-active illumination position, and a second position wherein said first receiving portion holds said first illumination device in one of said at least one in-active illumination position and said second receiving portion holds said second illumination device in said active illumination position, and wherein said irradiation arrangement is configured to emit an illumination beam only from the one of said first and second illumination devices arranged in said active illumination position,
  - guiding elements configured to guide the movement of said carrier form said first position to said second position
  - an actuator for physically moving said carrier form said first position to said second position based on the condition of said first illumination device and/or in response to a user-initiated input.

According to a second aspect thereof, the invention relates to a method for operating an apparatus for detecting matter (102), the apparatus comprising:

an irradiation arrangement, which comprises a first illumination device adapted to emit a first set of illumination beams and a second illumination device adapted to emit a second set of illumination beams, a scanning element, an optical arrangement, adapted to receive and direct at least one of said first and second sets of illumination beams towards said scanning element, wherein the scanning element is configured to redirect said at least one of said first and second sets of illumination beams towards a first detection zone through which the matter is provided, a detector system including at least one sensor arrangement adapted to receive and analyse optical radiation which optical radiation is reflected, emitted and/or scattered by matter in the first detection zone, in response to said matter being irradiated by at least one of said first and second set of illumination beams, a reference arrangement comprising a white reference element, which reference arrangement is adapted to receive optical radiation from at least one of said first illumination device and said second illumination device and to direct said received optical radiation towards said detector system via said white reference element, which reference arrangement is arranged up stream of said scanning element comprising the steps of:

arranging said first illumination device in an active illumination position and said second illumination device in an in-active illumination position, emitting a first set of illumination beams from said first illumination device towards said first scanning element, based on the condition of said first illumination device and/or in response to a user-initiated input initiating a automated or semiautomated switching event wherein said first illumination device is moved to an in-active illumination position and said second illumination device is moved to said active illumination position, wherein said first and second illumination devices are preferably moved simultaneously to the respective one of an in-active illumination position and an active illumination position, wherein said irradiation arrangement is configured to emit an illumination beam only from the one of said first and second illumination devices arranged in said active illumination position.

Further details relating to the first and second aspects of the invention are presented below and in the dependent claims. It is pointed out that, details that are presented in relation to one of the aspects may also apply to the other aspect.

According to one exemplifying embodiment, the apparatus comprises two or more automated or semiautomated switching device each switching device comprising:

a carrier having a first receiving portion for receiving and holding a one illumination device, and a second receiving portion for receiving and holding a further illumination device, and wherein said carrier is movable between a first position, wherein said first receiving portion holds said one illumination device in an active illumination position and said second receiving portion holds said further illumination device in one of at least one in-active illumination position, and a second position wherein said first receiving portion holds said one illumination device in one of said at least one in-active illumination position and said second receiving portion holds said further illumination device in said active illumination position, and wherein said irradiation arrangement is configured to emit an illumination beam only from the one of said one and further illumination devices arranged in said active illumination position, guiding elements configured to guide the movement of the carrier form said first position to said second position an actuator for physically moving at least one, two or all carriers of said apparatus form said first position to said second position based on the condition of said one illumination device and/or in response to a user-initiated input.

According to one exemplifying embodiment, the carrier follows a substantially linear, stepwise, curved and/or circular path from said first position to said second position. According to one exemplifying embodiment, the actuator causes the carrier to perform one or more of a linear, curvilinear or rotational motion from said first position to said second position. According to one example, the circular path is at least a semi-circular path, or at most a semicircular path, and/or at most a quarter-circular path.

According to one exemplifying embodiment, the user-initiated input is provided at the set-up of the detection system, and comprises information about which illumination devices that is to be used for this particular detection session, and the second illumination device preferably emits a different spectrum compared to said first illumination device. Additionally or alternatively, the user-initiated input is provided as the user wants to switch illumination device based on the condition of the illumination source, e.g. due to that it has deteriorated due to age and the second illumination device is preferably a spare illumination device.

The apparatus comprises an irradiation arrangement which is adapted to emit only one of a first set of illumination beams and a second set of illumination beams at a time towards a first detection zone through which the matter is provided. It is only the illumination beams of the illumination device arranged in the active illumination position that is emitted. The first set of illumination beams and a second set of illumination beams emitted by the irradiation arrangement are both emitted towards a first detection zone.

The apparatus optionally comprises a reference arrangement comprising a white reference element, which reference arrangement is adapted to receive optical radiation from at least one of said first illumination device and said second illumination device and to direct said received optical radiation towards said detector system via said white reference element. A white reference element is a reference which reflects or transmits a substantially uniform spectrum within one or more predetermined wavelength intervals of interest. If e.g. all wavelengths within the visible spectrum is of interest, a white reference element will reflect or transmit light which is perceived as white when irradiated by a light source emitting a uniform spectrum over the whole visible wavelength range. However, if only or additionally wavelengths in the NIR spectrum is of interest, a white reference element will reflect or transmit optical radiation with a substantially uniform intensity when irradiated by a light source emitting a uniform spectrum over the NIR wavelength range of interest.

By analysing the optical radiation transmitted and/or reflected to the sensor device via the reference element, one may determine the condition of the illumination device in the active illumination position. A switching event where said first illumination device is moved out and the second illumination device is moved into the active illumination position may be initiated based on the determined condition of said first illumination device, e.g. if the first illumination device is broken or the spectrum of said first illumination device does not reach a predetermined requirement with respect to e.g. the emitted spectrum. According to one example the sensor device and the processing unit may be used for analysing the optical radiation to determine the condition of the illumination device.

The irradiation arrangement comprises an active illumination position and at least one in-active illumination position, and an automated or semiautomated switching device comprising a carrier having a first receiving portion for receiving and holding said first illumination device, and a second receiving portion for receiving and holding said second illumination device. The carrier is movable between a first position and a second position. When the carrier is in the first position said first receiving portion holds said first illumination device in said active illumination position and said second receiving portion holds said second illumination device in one of said at least one in-active illumination position. When the carrier is in the second position the first receiving portion holds said first illumination device in one of said at least one in-active illumination position and said second receiving portion holds said second illumination device in said active illumination position. The irradiation arrangement is configured to emit an illumination beam only from the one of said first and second illumination devices arranged in said active illumination position. The switching device also comprises guiding elements configured to guide the movement of said carrier form said first position to said second position, and an actuator for physically moving said carrier form said first position to said second position based on the condition of said first illumination device and/or in response to a user-initiated input. Optionally, the actuator is also configured to move said carrier from said second position to said first position based on e.g. a user-initiated input and/or a signal from the processing unit.

According to one exemplifying embodiment, said irradiation arrangement comprises a first in-active illumination position and a second in-active illumination position, said second illumination device is arranged in said first in-active illumination position when said carrier is arranged in said first position, said first illumination device is arranged in said second in-active illumination position when said carrier is arranged in said second position, and said active illumination position is arranged between said first and second in-active illumination positions in a direction along said guiding element.

Additionally or alternatively, said guiding elements is configured for guiding said carrier preferably along a substantially rotational or linear path from said first position to said second position.

Additionally or alternatively, said guiding element preferably comprises one, two or more guiding rails and at least one connector, wherein the at least one connector connects said carrier to said at least one guiding rails. According to one example, where there are two guiding rails, these are arranged on two opposite sides of a centre line of said carrier and each guiding rail extends in the direction of said substantially linear path.

According to one exemplifying embodiment the switching device further comprises a positioning element for preventing said actuator from moving said carrier beyond said second position, additionally or alternatively. the switching device further comprises a positioning element for preventing said actuator from moving said carrier beyond said first position.

According to one exemplifying embodiment, the first receiving portion is configured holding said first illumination device in electrical contact (e.g. by means of direct electrical contact or by induction) with a terminal for powering said first illumination device, and the second receiving portion is configured for holding the second illumination device in electrical contact (e.g. by means of direct electrical contact or by induction) with a terminal for powering second first illumination device. The first and second receiving portions are preferably configured for holding the respective illumination device in electrical contact with the respective terminal in both said first and second position, but the illumination device is only powered in said active illumination position.

According to one exemplifying embodiment, the optical arrangement further comprises a focusing arrangement, wherein the focusing arrangement is adapted to direct and converge the one of the first set of illumination beams and the second set of illumination beams which is arranged in the active illumination position, and is configured to converge that set of illumination beams towards the scanning element, and preferably focus said one of the first set of illumination beams and the second set of illumination beams in the vicinity of the first detection zone.

According to one exemplifying embodiment, the detector system comprises a a first spectrometer system adapted to analyse optical radiation of a first wavelength interval and optionally a second spectrometer system adapted to analyse optical radiation of a second wavelength interval. Additionally or alternatively, the detector system comprises a camera based detector system.

According to one exemplifying embodiment, the camera based detector system comprises a laser triangulation system (124) including:

a laser arrangement (126) adapted to emit a line of laser light (130) towards said first or a second detection zone (106) through which the matter (102) is provided, and a camera-based sensor arrangement (128) configured to receive and analyse light (132) which is reflected, emitted and/or scattered by matter (102) in the first or second detection zone (106), wherein the received light (132) of the camera-based sensor arrangement (128) originating from the line of laser light (130).

It should be noted that within the context of this application, the term set of illumination beams may be any type of optical radiation, visible or non-visible such as NIR, IR or UV, having an extension other than an infinite decimal beam or ray. In other words, the set of illumination beams may mean any bundle or beam of optical radiation having a physical extension in space travers to its propagation direction. The set of illumination beams may thus for instance form a beam of parallel light, a beam of non-parallel light, like a diverging or converging beam of light, or a band of light to give a few non-limiting examples.

The first set of illumination beams and a second set of illumination beams will hence reach the first detection zone through which matter is provided. The matter is provided through the first detection zone in the sense that the matter is transferred or conveyed through the first detection zone. The matter may be provided through the first detection zone in a continuous or intermittent manner. The matter may be provided through the first detection zone sequentially or in parallel. Hence, a single piece of matter or a plurality of pieces of matter may be in the first detection zone at the same time. Preferably a plurality of pieces of matter are present simultaneously in the first detection zone.

The apparatus comprises a sensor system adapted to receive and analyse optical radiation which is reflected, emitted e.g. by means of fluorescence or phosphorescence event and/or scattered by matter in the first detection zone. The received optical radiation of the spectroscopy system is originating or predominantly originating from the first or second sets of illumination beams, dependent on which of the illumination devices that is in the active illumination position. Hence, a limited amount of ambient optical radiation may reach the spectroscopy system. The sensor system is thus adapted such that it views the first detection zone in order to receive and analyse optical radiation which is reflected, emitted and/or scattered by matter in the first detection zone. Optical elements may be provided between an entry window of the sensor system and the first detection zone to alter a beam path of the optical radiation being reflected, emitted and/or scattered by matter in the first detection zone.

The apparatus optionally comprises a laser triangulation system. The laser triangulation system includes a laser arrangement adapted to emit a line of laser light towards a second detection zone through which the matter is provided. The laser arrangement typically includes one or more lasers and optionally optical elements for forming emitted laser light into a line of laser light.

Is should be noted that within the context of this application, the term line of laser light may be any type of optical radiation emitted by a laser, visible or non-visible, having an elongated extension, such that the optical radiation forms a line or a line like profile when impinging on a surface.

The matter is optionally provided through the second detection zone correspondingly to what has been described above in relation to the first detection zone. The matter may subsequently or parallelly be provided through the second detection zone.

The laser triangulation system includes a camera-based sensor arrangement configured to receive and analyse optical radiation which is reflected, emitted and/or scattered by matter in the first or second detection zone. The received optical radiation of the camera-based sensor arrangement is originating or predominantly originating from the line of laser light. Hence, a limited amount of ambient optical radiation may still reach the camera-based sensor arrangement. The camera-based sensor arrangement is thus adapted such that it views the detection zone in order to receive and analyse optical radiation which is reflected, emitted and/or scattered by matter in the second detection zone. Like in any laser triangulation system, the reflected optical radiation of the line of laser light will move on the sensor element of the camera-based sensor arrangement in response to a height variation of the matter in the second detection zone. The sensor element of the camera-based sensor arrangement is typically an imaging sensor element including an array or matrix of sensor pixels sensitive to the optical radiation of interest.

The received optical radiation of a spectroscopy system may completely or partially intersect the received optical radiation of the camera-based sensor arrangement and/or the line of laser light. The particular provision of the spectroscopy system in relation to the camera-based sensor arrangement and/or the laser arrangement allows for a compact system requiring significantly less space.

In practice, the optical radiation received by the spectroscopy system, emitted and/or scattered by matter in the first detection zone, will completely or partially intersect or cross the received optical radiation of the camera-based sensor arrangement, i.e. the optical radiation originating from the line of laser light and having been reflected, emitted and/or scattered by matter in the second detection zone.

Alternatively, the optical radiation received by the spectroscopy system, will completely or partially intersect or cross the line of laser light. Hence, both the spectroscopy system (and the irradiation arrangement) and the laser triangulation system may be provided in the same area of the apparatus meaning that both these systems may be provided in a space normally required for a single system. This means that a compact apparatus with enhanced detection capabilities is provided by the present invention.

Moreover, the matter may typically subsequently or parallelly to being provided through the first detection zone be provided through the second detection zone. This allows for that specific matter provided in the first detection zone may subsequently or parallelly be correlated to be the same matter when provided in through the second detection zone. This means in practice, that the same matter typically will be analysed by both the spectroscopy system and the laser triangulation system, either in sequence or parallelly. Hence, a compact apparatus with enhanced detection capabilities is provided by the present invention.

The apparatus may further comprise a focusing arrangement, wherein the focusing arrangement is adapted to direct and converge the first set of illumination beams or the second set of illumination beams on a scanning element, wherein the scanning element being adapted to redirect the first and second sets of illumination beams towards the first detection zone, whereby the first and second set of illumination beams is focused in the vicinity of the first detection zone. Matter provided through the first detection zone may thus be efficiently illuminated by the first set of illumination beams or the second set of illumination beams converging at the first detection zone.

The scanning element may scan the first and second set of illumination beams at the first detection zone.

The scanning element may be one of a rotating polygon mirror and a tilting mirror.

The irradiation arrangement may include a further illumination device, besides said first and second illumination devices, which further illumination device is adapted to emit a further set of illumination beams. By this arrangement, a more intense illumination may be provided at the first detection zone. Further, the illumination of the first detection zone may easily be tailored by using different types of illumination devices having different characteristics as the first, second and further illumination devices. Furthermore, a more robust apparatus may be achieved. The apparatus may not need to be taken out of operation if one of the first and second illumination devices fails and may consequently still be operated during exchange of one of the illumination devices.

The focusing arrangement may include a first focusing element adapted to direct and converge the first and second set of illumination beams towards the scanning element and a further focusing element adapted to direct and converge the further set of illumination beams towards the scanning element, which is advantageous in that the first and further sets of illumination beams may be directed and converged individually towards the scanning element. The focusing elements may be any optical element capable of focusing and directing the first and/or further sets of illumination beams. The focusing elements may be a combination of a plurality of optical elements acting jointly. The focusing elements may direct the first, second and/or further sets of illumination beams along a direction of incoming optical radiation of the first, second and/or further sets of illumination beams. The first focusing element may be a lens or a mirror. The first focusing element may be a combination of a lens and a mirror. The further focusing element may be a lens or a mirror. The second focusing element may be a combination of a lens and a mirror.

The irradiation arrangement may include a single illumination device adapted to emit the first set of illumination beams and the further set of illumination beams, which is advantageous in that the irradiation arrangement may be made more energy efficient. Further, the irradiation arrangement may be made more compact since space may only have to be allocated to a single illumination device.

The first and/or further focusing element may be a lens or a mirror. The first and/or further focusing element may be a full parabolic mirror or one or more partial parabolic mirrors. The first and/or further focusing element may be a full elliptical mirror or one or more partial parabolic mirrors; or a mirror with a shape optimized to focus optical radiation into the first detection zone. The first and/or further focusing element may be an off-axis full or partial parabolic mirror. The first and/or further focusing element may be a combination of a lens and a mirror. The first and/or further focusing element may be a combination of a lens and a flat mirror.

The sensor system may be a spectroscopy system, which may include a first spectrometer system adapted to analyse optical radiation of a first wavelength interval and a second spectrometer system adapted to analyse optical radiation of a second wavelength interval, which is advantageous in that spectrometer systems adapted for analysis of a certain wavelength interval may be used. By this arrangement, more sensitive and accurate analysis may be performed. The first wavelength interval and the second wavelength interval may overlap or partially overlap. The first wavelength interval and the second wavelength interval may be separate intervals.

The spectroscopy system may include a first spectrometer system adapted to analyse optical radiation of a first wavelength interval, a second spectrometer system adapted to analyse optical radiation of a second wavelength interval and a third spectrometer system adapted to analyse optical radiation of a third wavelength interval.

The spectroscopy system may include a plurality of spectrometer systems adapted to analyse optical radiation of a plurality of wavelength intervals.

The spectroscopy system may be a scanning spectroscopy system, which is advantageous in that accurate analysis ranging over a wavelength interval may be performed on the matter in the first detection zone. Also, an image of the matter in the first detection zone may be acquired, where the image including information form the analysis of the optical radiation received by the scanning spectroscopy system.

The first detection zone and the second detection zone may overlap, which is advantageous in that it may become easier to correlate matter in the first detection zone to corresponding matter in the second detection zone. In other words, it may become easier to determine when a particular piece of matter having passed through the first detection zone passes through the second detection zone. This setup is advantageous when the matter is traveling through the first detection zone and/or second detection zone in a random fashion, as is generally the case when the matter is free falling or sliding through the first detection zone and/or second detection zone.

The first detection zone and the second detection zone may overlap partially. The first detection zone and the second detection zone may overlap almost completely. Hence, the first detection zone and the second detection zone may be located partially at the same physical location.

The apparatus may further include a first optical filter arranged between the irradiation arrangement and the first detection zone, the first optical filter counteracting optical radiation originating from the first set of illumination beams and the second set of illumination beams from reaching the camera-based sensor arrangement. This arrangement of the first optical filter may counteract undesired optical radiation that otherwise would risk disturbing the camera-based sensor system form reaching the same. The provision of the first optical filter is particularly relevant and hence advantageous when the first detection zone and the second detection zone overlap.

The apparatus may further include a second optical filter arranged between the second detection zone and the camera-based sensor arrangement, the second optical filter counteracts passing of optical radiation originating from the first set of illumination beams, the second set of illumination beams and ambient optical radiation while allowing passage of optical radiation originating from the line of laser light. This arrangement of the second optical filter may counteract undesired optical radiation that otherwise would risk disturbing the camera-based sensor arrangement form reaching the same. The provision of the second optical filter is particularly relevant and hence advantageous when the first detection zone and the second detection zone overlap.

The laser arrangement may further be adapted to emit a further line of laser light towards the first or the second detection zone, and the camera-based sensor arrangement may be further configured to receive and analyse optical radiation originating from the further line of laser light which is reflected, emitted and/or scattered by matter in the first or the second detection zone.

A wavelength of the optical radiation of the further line of laser light may be different form a wavelength of the optical radiation of the line of laser light.

The apparatus may further include a third optical filter arranged between the second detection zone and the camera-based sensor system, the second optical filter counteracts passing of optical radiation originating from the first set of illumination beams, the second set of illumination beams, the laser light and ambient optical radiation while allowing passage of optical radiation originating from the further line of laser light.

By the provision of a further line of laser light having a different wavelength than a wavelength of the laser line in combination with the third optical filter, the camera-based may be configured to receive and analyse optical radiation which is reflected, emitted and/or scattered by matter in the second detection zone based on different wavelengths. The received optical radiation originating from the line of laser light and from the further line of laser light may advantageously be directed to different areas of an imaging sensor element of the camera-based sensor system or to different imaging sensor elements of the camera-based sensor system. The possibility to analyse optical radiation which is reflected, emitted and/or scattered by matter in the second detection zone based on different wavelengths brings about that more information about the matter in the second detection zone may be acquired.

The apparatus may further comprise a processing unit coupled to the sensor system, such as the spectroscopy system and/or the camera-based sensor arrangement, wherein the processing unit may be configured to determine a first property set pertaining to matter in the first detection zone based on an outputted signal of the spectroscopy system, and wherein the processing unit may be configured to determine a second property set pertaining to matter in the first or second detection zone based on an outputted signal of the camera-based sensor arrangement. The provision of a processing unit coupled to the spectroscopy system and/or the camera-based sensor arrangement brings about that the processing unit may determine properties or a property of matter in the respective first and/or second detection zones. The processing unit may thus receive signals form the spectroscopy system and the camera-based sensor arrangement respectively. The received signals may be based on analysis of the optical radiation received by the spectroscopy system and/or the camera-based sensor arrangement respectively.

Is should be noted that within the context of this application, the term processing unit may be any unit, system or device capable of receiving a signal or signals or data from other entities and to process the received signals or data. The processing may for instance include calculating properties or a property based on the received the received signals or data, forwarding of the received signals or data and altering the received signals or data. The processing unit may be a single unit or may be distributed over a plurality of devices, such as a plurality of PCs, each having processing capabilities. The processing unit may be implemented in hardware or in software.

Is should be noted that within the context of this application, the term property set may be any set of data including any type of data. The property set may include any number of properties including 0. Hence, the property set may be an empty set, which for instance may be indicative of a non-presence of matter.

The first property set may be indicative of at least one of a spectral response of the matter, a material type of the matter, a colour of the matter, a fluorescence of the matter, a ripeness of the matter, a dry matter content of the matter, a water content of the matter, a fat content of the matter, an oil content of the matter, a calorific value of the matter, a presence of bones or fishbones of the matter, a presence of pest, a mineral type of the matter, an ore type of the matter, a defect level of the matter, a detection of hazardous biological materials of the matter, a presence of matter, a non-presence of matter, a detection of multilayer materials of the matter, a detection of fluorescent markers of the matter, a detection of phosphorescent markers of the matter 102, a quality grade of the matter, a physical structure of the surface of the matter and a molecular structure of the matter.

An example of a relevant hazardous biological material that may be detected is mycotoxin.

The above features of the first property set may be determined in specific combinations which may be useful for detecting matter in the first detection zone. Examples of applications where such combinations are useful are sorting of pet food, detection of fishbones in fillets, paper sorting using visible and NIR spectroscopy, removal of foreign material and shells from pistachios, recycling of polymers to give a few non-limiting examples.

The second property set may be indicative of at least one of a height of the matter, a height profile of the matter, a 3D map of the matter, an intensity profile of reflected, emitted and/or scattered optical radiation, a volume centre of the matter, an estimated mass centre of the matter, an estimated weight of the matter, an estimated material of the matter a presence of matter, a non-presence of matter, a detection of isotropic and anisotropic optical radiation scattering of the matter, a structure and quality of wood, a surface roughness and texture of the matter and an indication of presence of fluids in the matter.

Examples of a relevant fluids are oil and water in food products.

The above features of the second property set may be determined in specific combinations which may be useful for detecting matter in the second detection zone. Examples of applications where such combinations are useful are glass sorting and quartz sorting to give a few non-limiting examples.

The processing unit may be further configured to receive an input indicative of a viewing angle of the camera-based sensor arrangement with respect to the first or second detection zone, and to compensate for the viewing angle of the camera-based sensor arrangement when determining the second property set, which is advantageous in that a more accurate subsequent sorting or ejection of the matter may be achieved. In practice the height of the matter in the first or the second detection zone may be compensated for when determining a position of the matter in the first or the second detection zone. By this, a subsequent sorting or ejection operation may affect or influence the matter in a location counteracting wrongful sorting or ejection. For instance, a sorter or ejector may impinge on matter at its estimated mass center thereby reducing the risk of for instance slipping or tumbling of the matter. An ejector may be configured with valve image processing steps for reducing or minimizing the compressed air consumption and energy consumption while keeping optimal sorting yield and sorting loss.

The processing unit may be configured to receive an input indicative of a geometry of the laser arrangement and the camera-based sensor arrangement with respect to the first or the second detection zone.

The processing unit may be configured to compensate for the geometry of the laser arrangement and the camera-based sensor arrangement with respect to the first or the second detection zone when determining the second property set.

The apparatus may further comprise an ejection arrangement coupled to the processing unit, wherein the ejection arrangement is adapted to eject and sort matter into a plurality of fractions in response to receiving a signal form the processing unit based on the determined first property set and/or the determined second property set, the ejection arrangement being adapted to eject and sort said matter by means of at least one of a jet of compressed air, a jet of pressurized water, a mechanical finger, a bar of jets of compressed air, a bar of jets of pressurized water, a bar of mechanical fingers, a robotic arm and a mechanical diverter.

By the provision of an ejection arrangement coupled to the processing unit, the apparatus may eject and thus sort the matter into a plurality of fractions based on the determined first property set and/or the determined second property set. Hence, the matter may be sorted based on analysis performed by the spectroscopy system and/or the laser triangulation system.

The plurality of fractions may be based on any of the determined properties. The fractions may for instance be based on material or colour. One faction may correspond to matter that is to be discarded or scrapped.

The ejection and sorting may be executed by a jet of compressed air, a jet of pressurized water, a mechanical finger, a bar of jets of compressed air, a bar of jets of pressurized water, a bar of mechanical fingers, a robotic arm or a mechanical diverter.

Alternatively, to being ejected and sorted the matter may be analyzed online by for instance a cloud service. The so analyzed matter may then be classified for instance in terms of purity, defect level, average color etc.

The apparatus may further comprise, a conveyor for conveying matter through the first detection zone and the second detection zone, or a chute, optionally including a vibration feeder, for sliding or freefalling of the matter through the first detection zone and/or the second detection zone.

By the provision of a conveyor, the matter may be conveyed through the first detection zone and second detection zone in a controlled manner. Matter conveyed through and analysed in the first detection zone may then be conveyed through and analysed in the second detection zone. By a controlled conveyance of matter through the first detection zone and the second detection zone matter may be kept track of. Hence, matter in the first detection zone may be correlated or identified as being the same matter in the second detection zone.

By the provision of a chute, optionally including a vibration feeder, the matter may be slid or made freefalling through the first detection zone and/or the second detection zone. The matter may be slid though the first detection zone and the second detection zone. The matter may be made to freefall through the first detection zone and the second detection zone. The matter may be slid though the first detection zone and made to freefall through the second detection zone. The provision of a chute, optionally including a vibration feeder, is advantageous for small bulk object such as grains of different kinds.

A further scope of applicability of the present invention will become apparent from the detailed description given below. However, it should be understood that the detailed description and specific examples, while indicating preferred variants of the present inventive concept, are given by way of illustration only, since various changes and modifications within the scope of the inventive concept will become apparent to those skilled in the art from this detailed description.

Hence, it is to be understood that this inventive concept is not limited to the particular component parts of the device described as such device may vary. It is also to be understood that the terminology used herein is for purpose of describing particular variants only, and is not intended to be limiting. Something that has been described as part of a whole, may also be used on its own. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements.

BRIEF DESCRIPTION OF THE DRAWINGS

The aspects of the present inventive concept, including its particular features and advantages, will be readily understood from the following detailed description and the accompanying drawings. The figures are provided to illustrate the general structures of the present inventive concept. Like reference numerals refer to like elements throughout.

DETAILED DESCRIPTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and fully convey the scope of the present inventive concept to the skilled person.

Figure 1:
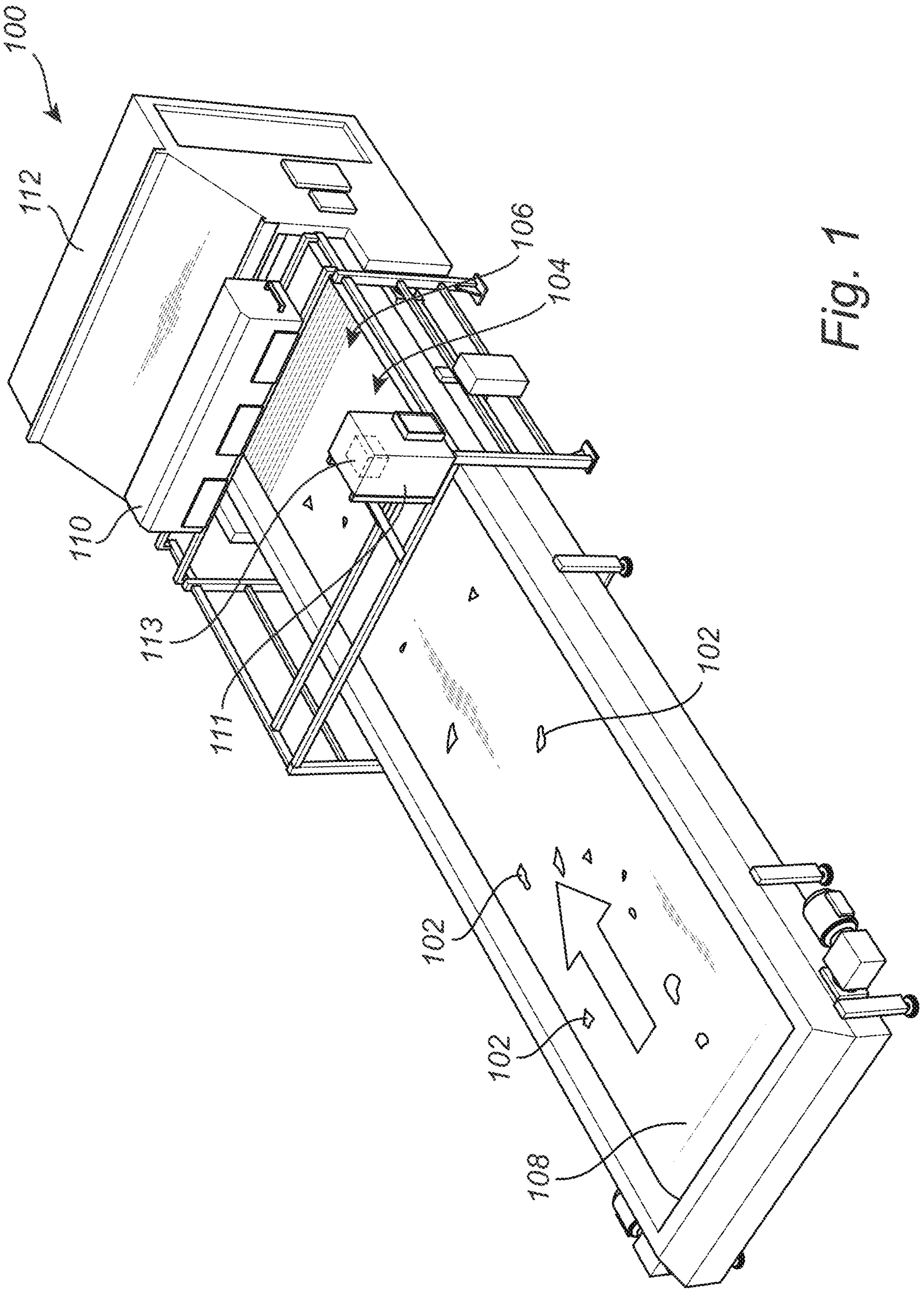
FIG. 1 is a perspective schematic view of an apparatus for detecting matter.

FIG. 1 schematically illustrates an apparatus 100 for detecting matter. Matter 102 is provided through a first detection zone 104 and a second detection zone 106.

In the depicted apparatus 100 of FIG. 1, the matter 102 is conveyed through provided through the first detection zone 104 and the second detection zone 106 by means of a conveyor 108. However, the matter 102 may be provided through the first detection zone 104 and the second detection zone 106 by any suitable means or manually without any technical means. Further, the matter 102 may be provided through the first detection zone 104 and the second detection zone 106 by sliding or freefalling. Hence, the conveyor of FIG. 1 is optional.

The depicted apparatus 100 of FIG. 1 further includes a housing 110 arranged above the first detection zone 104 and the second detection zone 106. In other words, the housing 110 is arranged above the conveyor 108.

Figure 2:
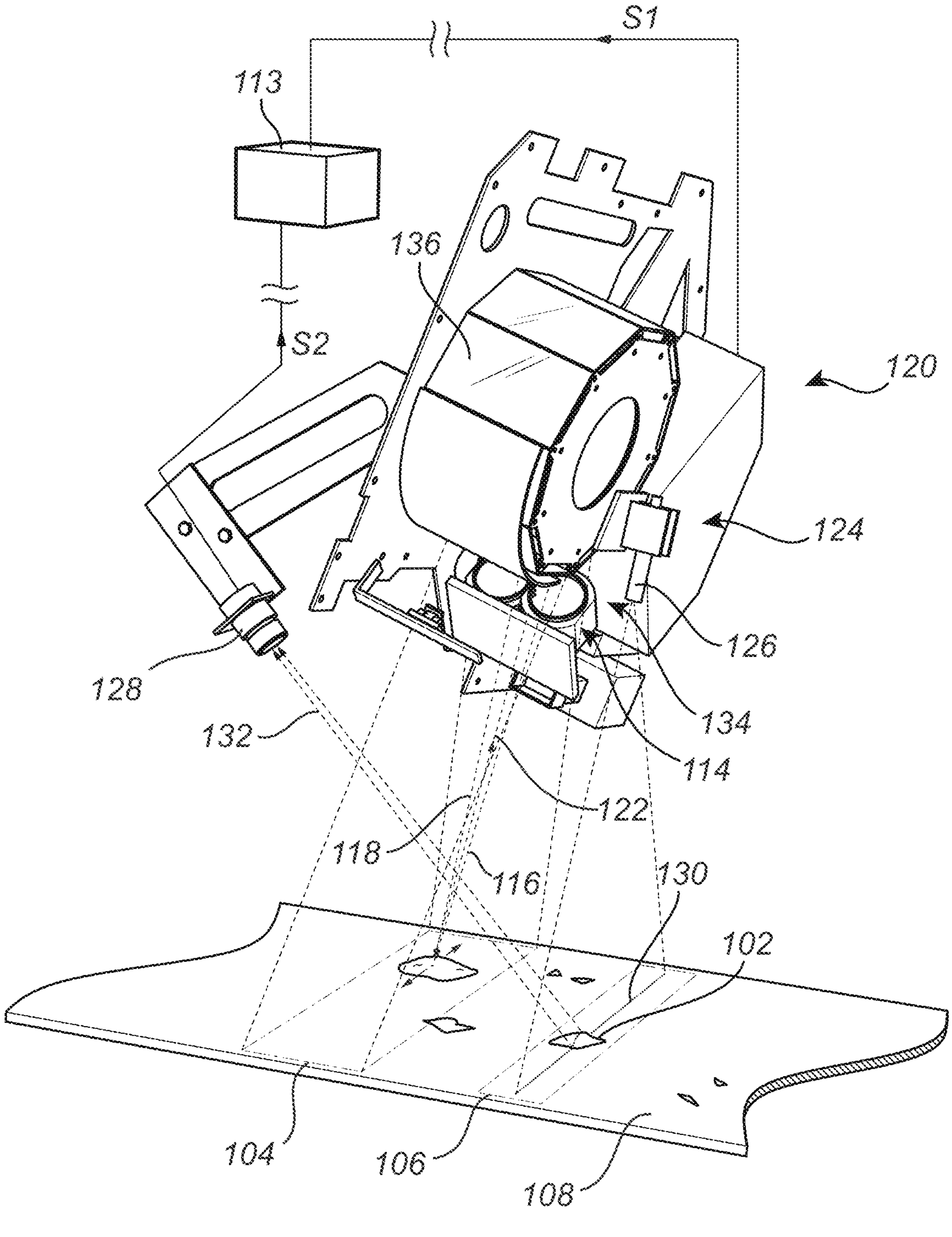
FIG. 2 is a schematic perspective detail view of the apparatus of FIG. 1.

Now also referring to FIG. 2 which schematically discloses a selection of components arranged in the housing 110.

In the interior of the housing 110 there is provided an irradiation arrangement 114 adapted to emit a first set of illumination beams 116 and a second set of illumination beams 118 towards the first detection zone 104.

In the interior of the housing 110 there is provided a spectroscopy system 120 adapted to receive and analyse optical radiation 122 which is reflected, emitted and/or scattered by matter 102 in the first detection zone 104.

In the interior of the housing 110 there is provided a laser triangulation system 124. The laser triangulation system 124 includes a laser arrangement 126 adapted to emit a line of laser light 130 towards the second detection zone 106. The laser triangulation system 124 includes a camera-based sensor arrangement 128 configured to receive and analyse optical radiation 132 which is reflected, emitted and/or scattered by matter 102 in the second detection zone 106.

The depicted apparatus 100 of FIG. 1 further includes an ejection arrangement 112 provided downstream of the first detection zone 104 and the second detection zone 106. The ejection arrangement 112 is adapted to eject and sort the matter 102 into a plurality of fractions. However, the ejection arrangement 112 of FIG. 1 is optional.

The depicted apparatus 100 of FIG. 1 further includes a control cabinet 111 arranged above the conveyor 108. The control cabinet 111 includes equipment used for controlling the apparatus 100. The equipment typically includes a processing unit 113 or control unit for controlling the conveyor 108, the ejection arrangement 112 and the equipment in the housing 110. The processing unit 113 is typically used to determine properties or a property of the matter 102 based on measurement carried out by the equipment in the housing 110.

Now referring to FIG. 2 in particular, here is conceptually depicted components in the interior of the housing 110 of FIG. 1. FIG. 2 also illustrates a portion of the conveyor 108 including the first detection zone 104 and the second detection zone 106.

As can be seen I FIG. 2, the received optical radiation 122 of the spectroscopy system 120 intersects the received optical radiation 132 of the camera-based sensor arrangement 128.

Matter 102 is provided through the first detection zone 104 and the second detection zone 106 by means of the conveyor 108. In other words, the matter 102 is in the depicted apparatus 100 of FIGS. 1 and 2 conveyed through the first detection zone 104 and the second detection zone 106. The matter 102 is typically conveyed through the first detection zone 104 and the second detection zone 106 continuously. The matter 102 may be conveyed through the first detection zone 104 and the second detection zone 106 in an intermittent manner. The matter 102 may be conveyed through the first detection zone 104 first and subsequently through the second detection zone 106. The matter 102 may be conveyed through the second detection zone 106 first and subsequently through first detection zone 104.

The laser arrangement 126 includes a line laser which emits the line of laser light 130. The laser may be of any suitable kind. The laser preferably has a peak wavelength at 660 nm or 640 nm. An example of a suitable laser is Z100M18S3-F-660-LP60-PR manufactured by Z-Laser which emits a line of laser light having a wavelength of 660 nm. The laser arrangement 126 may be equipped with a thermoelectric cooling device and insulation to withstand a typical ambient temperature of 60° C. The line of laser light 130 impinges on the matter 102 in the second detection zone 106, where the optical radiation is reflected, emitted and/or scattered by the matter 102. A portion of the so reflected, emitted and/or scattered optical radiation 132 typically reaches the camera-based sensor arrangement 128, as schematically illustrated in FIG. 2. Hence, the camera-based sensor arrangement 128 will view and consequently image the line of laser light 130 as it impinges on the matter 102 in the second detection zone 106. The camera-based sensor arrangement 128 may for instance include a camera of the type C5 manufactured by AT—Automation Technology GmbH. Hence, as in any laser triangulation system 124 a height variation or a presence of the matter 102 in the second detection zone 106 will shift the location of the image of the line of laser light on a sensor element of the camera of the camera-based sensor arrangement 128. The shift owing form the angle difference between the field of view of the of the camera of the camera-based sensor arrangement 128 and the line of laser light 130. Various properties of the matter 102 in the second detection zone 106 may be determined based on measurements carried out by the camera-based sensor arrangement 128.

Further, in conjunction with the depicted irradiation arrangement 114 there is provided a focusing arrangement 134. The focusing arrangement 134 is adapted to direct and focus the first set of illumination beams 116 and the second set of illumination beams 118 on a scanning element 136. The scanning element 136 is adapted to redirect the first and second sets of illumination beams 116, 118 towards the first detection zone 104. By the arrangement of the scanning element 136 the first and second set of illumination beams 116, 118 converge at the first detection zone 104 as illustrated in FIG. 2. The depicted scanning element 136 of FIG. 2 is in the form of a rotational polygon mirror. Thus, by rotating the polygon mirror scanning of the first set of illumination beams 116 and the second set of illumination beams 118 in the first detection zone 104 will occur. The first set of illumination beams 116 and the second set of illumination beams 118 will hence be scanned across the first detection zone 104 and consequently be scanned across the conveyor 108.

Other types of scanning elements may be used to advantage. For example, a scanning mirror hinged about a pivot axis may be used.

As described above, the spectroscopy system 120 is adapted to receive and analyse optical radiation 122 which is reflected, emitted and/or scattered by matter 102 in the first detection zone 104. The optical radiation 122 which is reflected, emitted and/or scattered by matter 102 in the first detection zone 104 will before entering the spectroscopy system 120 impinge on the scanning element 136, i.e. the polygon mirror, form where the optical radiation 122 is directed to an entry window of the spectroscopy system 120 by means of a fixed folding mirror. The fixed folding mirror may be located between where the first set of illumination beams 116 and the second set of illumination beams 118 exits the focusing arrangement 134.

The spectroscopy system 120 may include a spectrometer manufactured by Tomra which is able to cope with the required repetition rate. The spectrometer may be configured to analyse optical radiation in the wavelength interval 400-1000 nm. The spectrometer may be configured to analyse optical radiation in the wavelength interval 500-1000 nm. The spectrometer may be configured to analyse optical radiation in the wavelength interval 1000-1900 nm. The spectrometer may be configured to analyse optical radiation having a wavelength above 900 nm. The spectrometer may be configured to analyse optical radiation in the wavelength interval 1900-2500 nm. The spectrometer may be configured to analyse optical radiation in the wavelength interval 2700-5300 nm. The spectrometer may be configured to analyse optical radiation in the wavelength interval 900-1700 nm. The spectrometer may be configured to analyse optical radiation in the wavelength interval 700-1400 nm. The spectrometer may analyse visible light. The spectrometer may analyse NIR optical radiation. The spectrometer may analyse IR optical radiation. Different types of spectrometers may be used depending on characteristics of the matter 102 to be detected.

More than one spectroscopy system 120 may be used in the apparatus 100. Hence, more than one spectrometer may be used in the apparatus 100. For instance, the spectroscopy system 120 may include a first spectrometer system 120 adapted to analyse optical radiation of a first wavelength interval and a second spectrometer system 120 adapted to analyse optical radiation of a second wavelength interval. As an example, a first spectroscopy system 120 may analyse optical radiation in the wavelength interval 450-800 nm and a second spectroscopy system 120 may analyse optical radiation in the wavelength interval 1500-1900 nm. For instance, one spectrometer for visible light may be used in combination with one NIR spectrometer.

Similarly, three or more spectroscopy systems 120 may be included in the spectroscopy system 120. Hence, three or more spectrometers may be used. For instance, one spectrometer for visible light may be used in combination with two NIR spectrometers.

The spectroscopy system 120 may be a scanning spectroscopy system 120. An example of a suitable scanning spectrometer is manufactured by Tomra.

Various properties of the matter 102 in the first detection zone 104 may be determined based on measurements carried out by the spectroscopy system 120.

As discussed above, the depicted apparatus 100 of FIGS. 1 and 2 includes a processing unit 113. The processing unit 113 is in the depicted apparatus 100 located in the control cabinet 111. The processing unit 113 is coupled to the spectroscopy system 120 and the camera-based sensor arrangement 128. The coupling between the processing unit 113, the spectroscopy system 120 and the camera-based sensor arrangement 128 is schematically illustrated by broken lines in FIG. 2. The processing unit 113 may be coupled to the spectroscopy system 120 and the camera-based sensor arrangement 128 by any suitable connection, including wired and wireless connections. Any connection capable of transmitting data in any format, digital or analogue, may be used to advantage.

The processing unit 113 of the depicted apparatus 100 is configured to determine a first property set pertaining to matter 102 in the first detection zone 106. As discussed above, the first property set may be any set of data including any type of data. The first property set may include any number of properties. The first property set is determined based on an outputted signal S1 of the spectroscopy system 120. The signal S1 may include any kind of data, proceed or raw. The processing unit 113 is thus configured to receive and analyse data based on the outputted signal S1 of the spectroscopy system 120 and to determine a first property set based on the signal S1.

The first property set may be indicative of at least one of a spectral response of the matter 102, a material type of the matter 102, a colour of the matter 102, a fluorescence of the matter 102, a ripeness of the matter 102, a dry matter content of matter 102, a water content of the matter 102, a fat content of the matter 102, an oil content of the matter 102, a calorific value of the matter 102, a presence of bones or fishbones of the matter 102, a presence of pest of the matter 102, a mineral type of the matter 102, an ore type of the matter 102, a defect level of the matter 102, a detection of hazardous biological materials of the matter 102, a presence of matter 102, a non-presence of matter 102, a detection of multilayer materials of the matter 102, a detection of fluorescent markers of the matter 102, a detection of phosphorescent markers of the matter 102, a quality grade of the matter 102, a physical structure of the surface of the matter 102 and molecular structure of the matter 102.

Also, the spectroscopy system 120 may include processing capabilities possibly used to process the actual raw data from the spectrometer or spectrometers of the spectroscopy system 120. This means that the spectroscopy system 120 may be capable of determining properties or a property to be included in the first property set by the processing unit 113. In other words, the processing unit 113 may be configured to simply include already processed data form the spectroscopy system 120 into the first property set.

For different applications of the apparatus 100 different properties are typically included in the first property set. In other words, the first property set is typically indicative of different properties for different applications of the apparatus 100.

In applications where waste is recycled, the first property set is typically indicative of polymer material, sleeve material and cap material.

In applications where fruit or vegetables are sorted, the first property set is typically indicative of foreign matter like polymers, stones and shells.

In applications where wood is sorted, the first property set is typically indicative of wood type and presence of foreign material.

The processing unit 113 of the depicted apparatus 100 is configured to determine a second property set pertaining to matter 102 in the second detection zone 108. As discussed above, the second property set may be any set of data including any type of data. The second property set may include any number of properties. The second property set is determined based on an outputted signal S2 of the camera-based sensor arrangement 128. The signal S2 may include any kind of data, proceed or raw data. The processing unit 113 is thus configured to receive and analyse data based on the outputted signal S2 of the of the camera-based sensor arrangement 128 and to determine a second property set based on the signal S2.

The second property set may be indicative of at least one of a height of the matter 102, a height profile of the matter 102, a 3D map of the matter 102, an intensity profile of reflected, emitted and/or scattered optical radiation 132, a volume centre of the matter 102, an estimated mass centre of the matter 102, an estimated weight of the matter 102, an estimated material of the matter 102, a presence of matter 102, a non-presence of matter 102, a detection of isotropic and anisotropic optical radiation scattering of the matter 102, a structure and quality of wood, a surface roughness and texture of the matter 102 and an indication of presence of fluids in the matter 102.

Also, the camera-based sensor arrangement 128 may include processing capabilities possibly used to process the actual raw data from the camera or cameras of the camera-based sensor arrangement 128. This means that the camera-based sensor arrangement 128 may be capable of determining properties or a property to be included in the second property set by the processing unit 113. In other words, the processing unit 113 may be configured to simply include already processed data form the camera-based sensor arrangement 128 into the second property set.

For different applications of the apparatus 100 different properties are typically included in the second property set, as has been described in conjunction with the first property set above. In other words, the second property set is typically indicative of different properties for different applications of the apparatus 100.

The processing unit 113 of the depicted apparatus 100 may be configured to compensate for the viewing angle of the camera-based sensor arrangement 128 with respect to the second detection zone 106 and hence with respect to the conveyor 108. In order to be able to compensate for the viewing angle of the camera-based sensor arrangement 128 with respect to the second detection zone 106, the processing unit 113 is configured to receive an input indicative of the viewing angle of the camera-based sensor arrangement 128 with respect to the second detection zone 106 i.e. with respect to the second detection zone 106 on the conveyor 108. Based on the received input related to the viewing angle, the processing unit 113 may thus compensate for the viewing angle of the camera-based sensor arrangement 128 with respect to the second detection zone 106 when determining the second property set based on the received signal S2.

The received input pertaining to the viewing angle of the camera-based sensor arrangement 128 with respect to the second detection zone 106 may be a static variable indicative of the viewing angle. The received input pertaining to the viewing angle of the camera-based sensor arrangement 128 with respect to the second detection zone 106 may be a dynamic input based on a measurement of the viewing angle. In the latter case, dynamic variations in for instance the conveyor 108 may be accounted for.

In practice, the height or a varying height of the matter 102 may be taken into account and compensated for when determining a position of the matter in the second detection zone 106. Moreover, the geometry of the laser arrangement 126 and the camera-based sensor arrangement 128 may be taken into account when determining the position of the matter in the second detection zone 106.

If the height of the matter 102 is not compensated for when determining a position of the matter 102 in the second detection zone 106, a subsequent ejection and sorting of the matter 102 may risk becoming less accurate since the actual position of the matter 102 may differ from the determined position. Wrongful or no ejection and sorting may also occur. For instance, the ejection arrangement 112 may impinge on a less favorable position at an edge region of the matter 102 resulting in a wrongful ejection and sorting of the matter 102. In other words, the ejection arrangement 112 may impinge on the matter in a position far away from the mass center of the matter 102, which in turn may result in that the matter is tumbling rather than being displaced, i.e. ejected and sorted.

The processing unit 113 may be configured to receive an input indicative of a geometry of the laser arrangement 126 and the camera-based sensor arrangement 128 with respect to the second detection zone 106.

The processing unit 113 of the depicted apparatus 100 may be configured to compensate for the geometry of the laser arrangement 126 and the camera-based sensor arrangement 128 with respect to the second detection zone 106, and hence with respect to the conveyor 108, when determining the second property set.

The ejection arrangement 112 of the depicted apparatus 100 is coupled to the processing unit 113. The ejection arrangement 112 is adapted to eject and thus sort matter 102 into a plurality of fractions. For instance, the matter 102 may be sorted into one scrap fraction and one fraction that is to be used. In case of fruits and vegetables, the matter 102, i.e. the fruits and vegetables, may be sorted into a plurality of fractions based on a colour which in turn corresponds to a ripeness level, defects or presence of foreign material.

The ejection and sorting performed by the ejection arrangement 112 may be initiated in response to receiving a signal form the processing unit 113. The signal from the processing unit 113 is typically based on the determined first property set and/or the determined second property set. Hence, the matter may be sorted based on analysis performed by the spectroscopy system 120 and/or the laser triangulation system 124.

The so received signal may be a simple on/off signal or may be a complex signal including for instance specific coordinates of the matter 102 when approaching the ejection arrangement 112. In the latter case, the ejection arrangement 112 may thus impinge on or grip specific matter 102 fulfilling specific criteria and do so in a specific location, resulting in that the matter 102 is ejected and thus sorted.

To perform the actual ejection and sorting, the ejection arrangement 112 may include a jet of compressed air, a jet of pressurized water, a mechanical finger, a bar of jets of compressed air, a bar of jets of pressurized water, a bar of mechanical fingers, a robotic arm and a mechanical diverter. The entities and principles used to perform the ejection and sorting are consequently known in the art per se.

Figure 3:
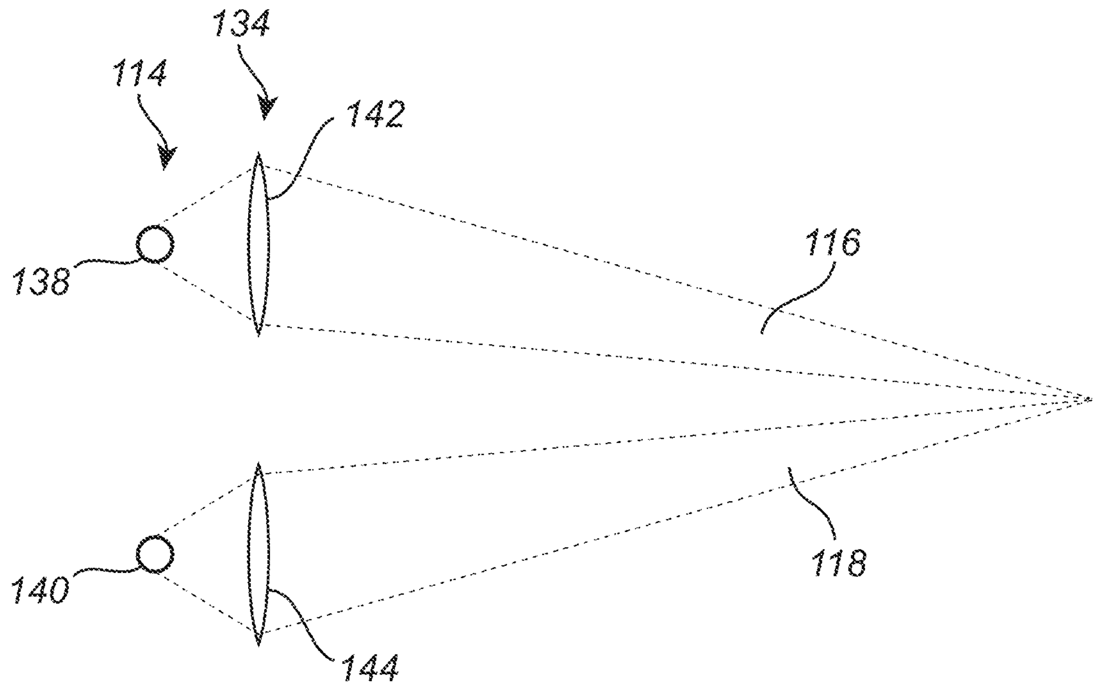
FIG. 3 is a schematic view of a first variant of an irradiation arrangement and associated focusing arrangement.

Now referring to FIG. 3, here is conceptually depicted a first variant of an irradiation arrangement 114 an associated focusing arrangement 134 which may be used in the apparatus 100 of FIGS. 1 and 2.

The depicted irradiation arrangement 114 of FIG. 3 in includes a first illumination device 138 and a second illumination device 140. The first illumination device 138 is adapted to emit the first set of illumination beams 116 and a second illumination device 140 is adapted to emit the second set of illumination beams 118.

The first illumination device 138 and the second illumination device 140 may be of the same type. The first illumination device 138 and the second illumination device 140 may be of different types. The first illumination device 138 and the second illumination device 140 may be broadband spectral sources such as halogen illumination devices. Suitable halogen illumination devices for the first illumination device 138 and the second illumination device 140 may have a spectral distribution starting at about 400 nm and significantly decaying at about 2.5 μm. A maximum emission power may occur at about 1.3 μm. As an alternative, Xenon arc illumination devices may be used for the first illumination device 138 and the second illumination device 140. A shorter wavelength such as from 200 nm and above may be achieved by using Xenon arc illumination devices. As further alternatives, LED illumination devices or heating elements may be used for the first illumination device 138 and the second illumination device 140. For UV-Fluorescence spectroscopy LED illumination devices may be used to advantage. For mid infrared spectroscopy heating elements may be used to advantage. For high spatial and spectral resolution spectroscopy systems, Supercontinuum lasers may be used for the first illumination device 138 and the second illumination device 140. For high spatial and spectral resolution multispectral systems, lasers at multiple wavelength may be used in combination for the first illumination device 138 and the second illumination device 140. For highly spatial resolution optimized multispectral systems, LED's and Pulsed LED's may be used for the first illumination device 138 and the second illumination device 140 preferably in conjunction with line scan cameras.

Further, the depicted focusing arrangement 134 of FIG. 3 in includes a first focusing element 142, in form of a lens, adapted to direct and focus the first set of illumination beams 116 on the scanning element 136 and a second focusing element 144, in form of a lens, adapted to direct and focus the second set of illumination beams 118 on the scanning element 136. Scanning element 136 is not depicted in FIG. 3 for reasons of simplicity. The first focusing element 142 and/or the second focusing element 144 may alternatively include a mirror. The first focusing element 142 and/or the second focusing element 144 may alternatively be a combination of at least one lens and at least one mirror.

Figure 4:
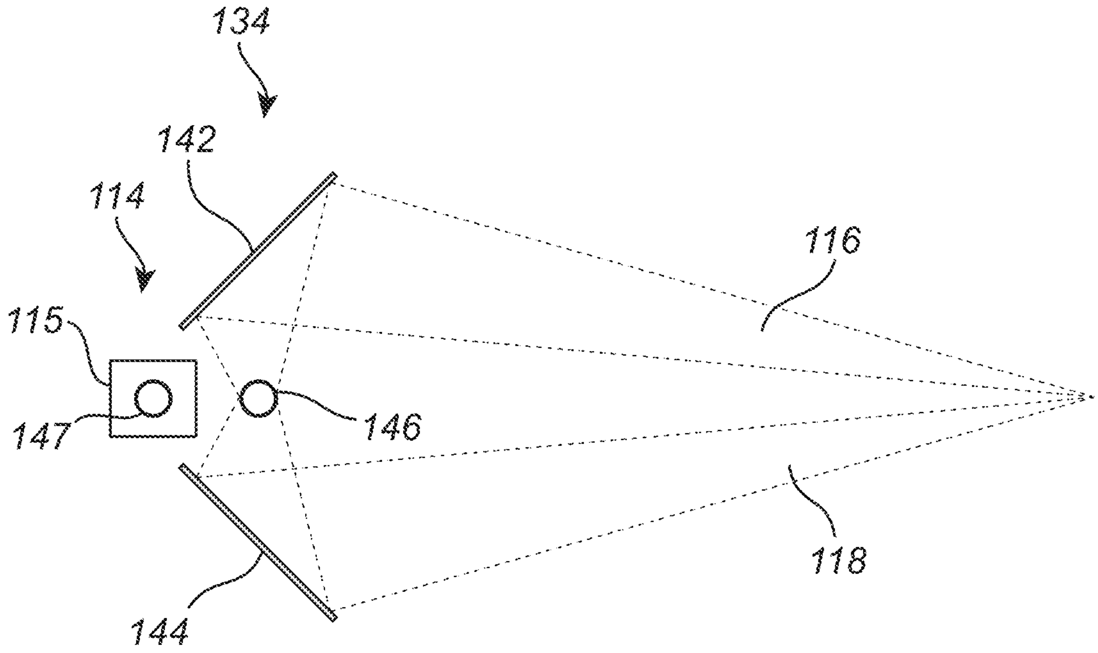
FIG. 4 is a schematic view of a second variant of an irradiation arrangement and associated focusing arrangement.

Now referring to FIG. 4, here is conceptually depicted a second variant of an irradiation arrangement 114 an associated focusing arrangement 134 which may be used in the apparatus 100 of FIGS. 1 and 2.

The depicted irradiation arrangement 114 of FIG. 4 in includes a single source 146. The single source 146 is adapted to emit the first set of illumination beams 116 the second set of illumination beams 118. In practice, the first set of illumination beams 116 the second set of illumination beams 118 are typically illumination beams emitted in different directions by the single source 146.

The single source 146 may be of any kind of the illumination devices described above in conjunction with FIG. 3.

Further, the depicted focusing arrangement 134 of FIG. 4 in includes a first focusing element 142, in form of an off axis parabolic mirror, adapted to direct and focus the first set of illumination beams 116 on the scanning element 136 and a second focusing element 144, in form of an off axis parabolic mirror, adapted to direct and focus the second set of illumination beams 118 on the scanning element 136. Scanning element 136 is not depicted in FIG. 4 for reasons of simplicity. The first focusing element 142 and/or the second focusing element 144 may alternatively include a flat mirror combined with an associated lens.

The depicted irradiation arrangement 114 of FIG. 4 including the single source 146, may include an automated or semiautomated illumination device switching device 115. The illumination device switching device 115 may hence be configured to physically move a spare illumination device 147 and the single illumination device 146 in case the single illumination device 146 fails. More specifically, in case the single illumination device fails 146, the illumination device switching device 115 may move the spare illumination device 147 into the position of the single illumination device 146 while removing the single illumination device 146. The illumination device switching device 115 may be configured to detect when the spare illumination device 147 has reached the correct position, i.e. the initial position of the single illumination device 146, and then switch on the spare illumination device 147. The illumination device switching device 115 may be automated and switch illumination device upon a detected failure of the single illumination device 146. As an alternative, the illumination device switching device 115 may be automated and switch illumination device in response to a user-initiated input.

Figure 9:
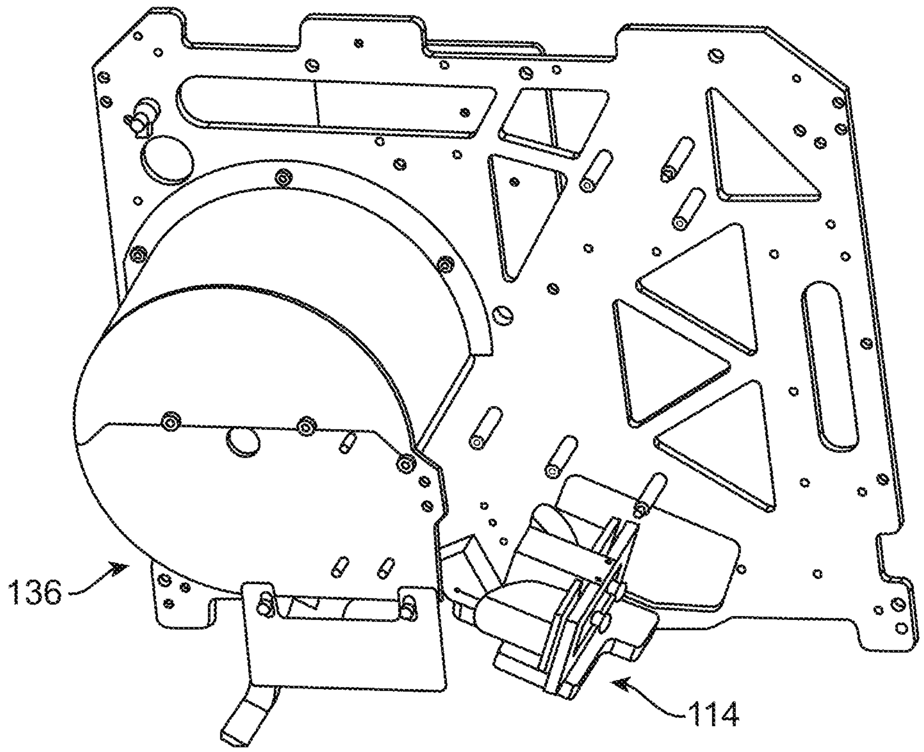
FIG. 9 schematically shows an irradiation arrangement comprising only one illumination device and a scanning element.

For explanatory reasons, FIG. 9 schematically shows the irradiation arrangement 114 comprising only one illumination device, which illumination device is arranged between two partial parabolic mirrors, which parabolic mirrors are configured for reflecting the optical radiation from the illumination device towards the scanning element 134.

Figure 10:
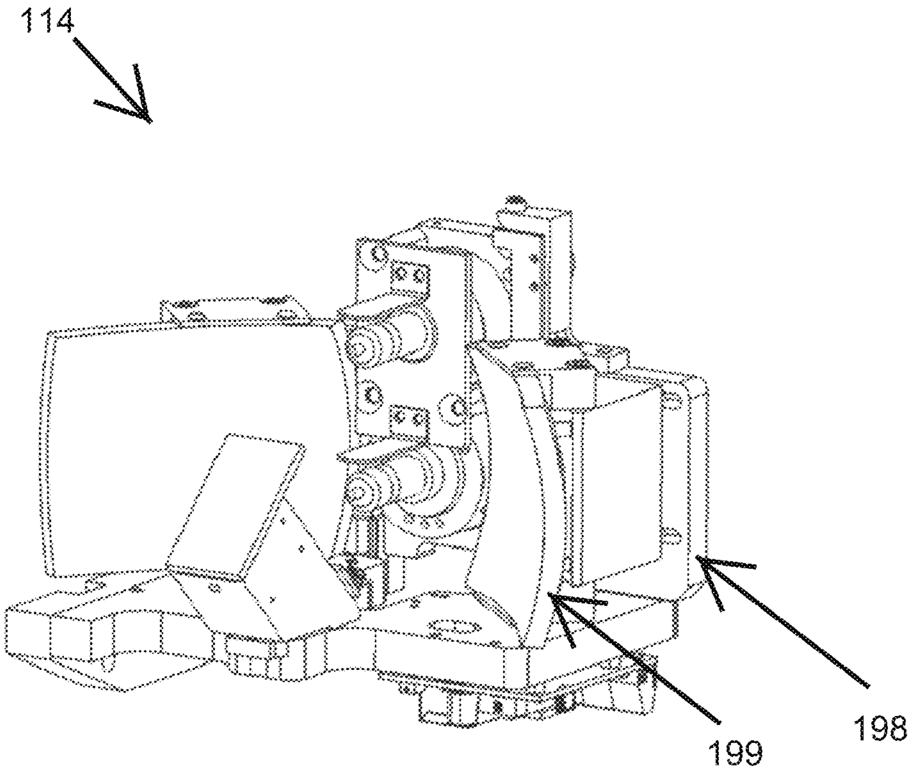
FIG. 10 schematically show a front view of the irradiation arrangement shown in FIG. 8*b*.

FIG. 10 schematically show the irradiation arrangement 114 shown in FIG. 9, except that the irradiation arrangement comprises a first illumination device and a second illumination device, wherein the first illumination device is arranged between two partial parabolic mirrors in the same way as the light source described in relation to FIG. 9, the first illumination device is arranged in an active illumination position. As seen in FIG. 10, a second illumination device is arranged in an in active position of the irradiation arrangement.

Figure 7A:
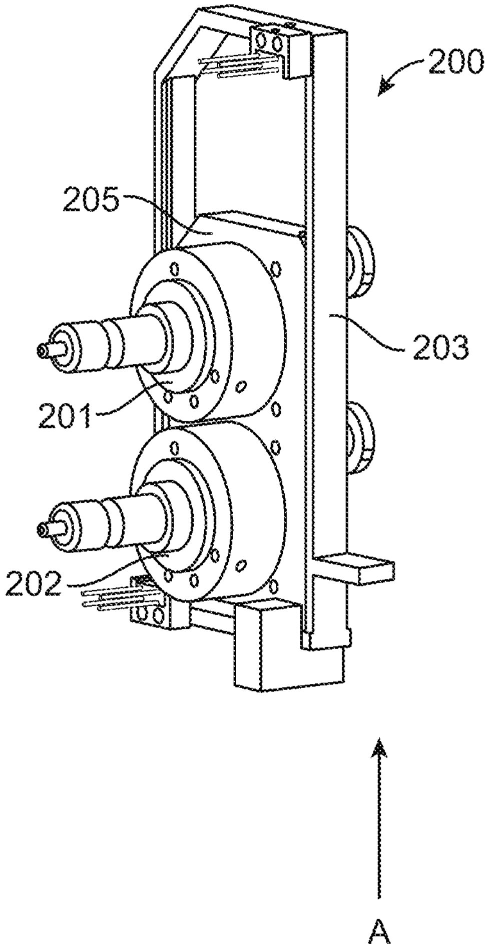
FIG. 7*a* shows a front view of an automated or semi-automated switching device, where a first illumination device is arranged in an active illumination position and a second illumination device is arranged in an in-active illumination position.

FIG. 7*a* shows an automated or semi-automated switching device 200, wherein a first illumination device 201 is arranged in an active illumination position and a second illumination device 202 is arranged in an in-active illumination position. In more detail, the first illumination device is adapted to emit a first set of illumination beams and the second illumination device is adapted to emit a second set of illumination beams. The illuminations beams emitted by the one of the first and second illumination device that is arranged in the active illumination position, is received and directed by the optical arrangement towards said scanning element. The automated or semiautomated switching device 200 comprises a carrier 205 having a first receiving portion 206 for receiving and holding said first illumination device 201 in electrical connection with a first terminal for providing power to said first illumination device, and a second receiving portion 207 for receiving and holding said second illumination device 202 in electrical connection with a second terminal 208 for providing power to said second illumination device, and wherein said carrier is movable between a first position (shown in FIG. 7*a*), wherein said first receiving portion holds said first illumination device in said active illumination position and said second receiving portion holds said second illumination device in one of said at least one in-active illumination position, and a second position (shown in FIG. 7*b*) wherein said first receiving portion holds said first illumination device in one of said at least one in-active illumination position and said second receiving portion holds said second illumination device in said active illumination position, and wherein said irradiation arrangement is configured to emit an illumination beam only from the one of said first and second illumination devices arranged in said active illumination position. The switching device also comprises guiding elements (203) configured to guide the movement of said carrier form said first position shown in FIG. 7*a* to said second position shown I FIG. 7*b*, as well as an actuator (not shown) for physically moving said carrier form said first position to said second position based on the condition of said first illumination device and/or in response to a user-initiated input.

Figure 7B:
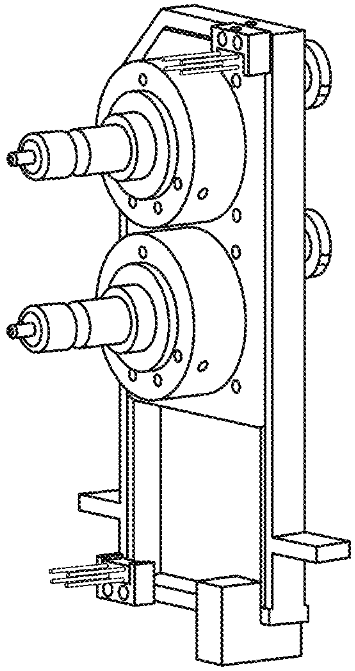
FIG. 7*b* shows the automated or semi-automated switching device shown in FIG. 7*a*, where the second illumination device is arranged in an active illumination position and the first illumination device is arranged in an in-active illumination position.

As shown in FIGS. 7*a* and 7*b*, said active illumination position is arranged between said first and second in-active illumination positions in a direction (A) along said guiding element, and the guiding elements is configured for guiding said carrier along a substantially linear path from said first position to said second position, The guiding elements shown in FIG. 7*a* comprises a pair of guiding rails extending in said direction (A) at least one connector here in the form of mating cut-outs or ridges for cooperation and connection of the carrier to the guiding rails.

The arrangement shown in FIG. 7*b* is equal to the one shown in FIG. 7*a* except that in FIG. 7*a* the first illumination device is arranged in the active illumination position and the second illumination device is arranged in the first in-active illumination position; while in FIG. 7*b* the second illumination device is arranged in the active illumination position and the first illumination device is arranged in the second in-active illumination position.

Figure 8A:
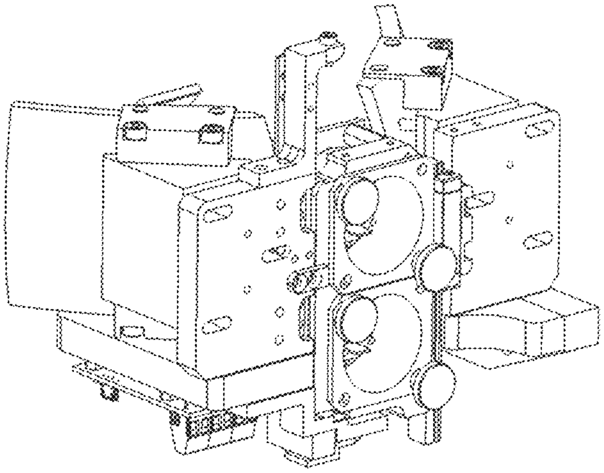
FIG. 8*a* shows a back view of an illumination arrangement comprising a switching device, where a first illumination device is arranged in an active illumination position and a second illumination device is arranged in an in-active illumination position.

FIG. 8*a* shows an illumination arrangement comprising a switching device arranged in the same way as the one shown in FIG. 7*a*, except that the front of the carrier and the illumination devices are shown in FIG. 7*a*, while the back of the carrier 205 and the first receiving portion 206 and the second portion 207 are shown in FIG. 8*a* together with an exemplifying optical arrangement. In FIG. 8*a* two supports 198 are shown to which the mirror arrangement of the optical arrangement is attached. One difference between the switching device shown in FIG. 7*a* and in FIG. 8*a* is that the guiding element 205 in FIG. 7*a* forms a frame that fully circumvents the carrier 205, where two sides of the guiding frame extends in direction A and form a pair of guiding rails; while the remaining sides of the frames, not extending in direction A, preferably forms positioning elements for preventing said actuator from moving said carrier beyond said second and first position respectively. In FIG. 8*a* the guiding elements forms a partial frame, that partially circumvents the carrier 205, where one side of the guiding frame extends in direction A and form a guiding rail; while the remaining sides of the frame, not extending in direction A, preferably forms a positioning elements or a stop for preventing said actuator from moving said carrier beyond said second and first position respectively. Optionally, an adjustable positioning element 204 e.g. a screw may be provided so as to enable a tuning of the end position of the carrier.

Figure 8B:
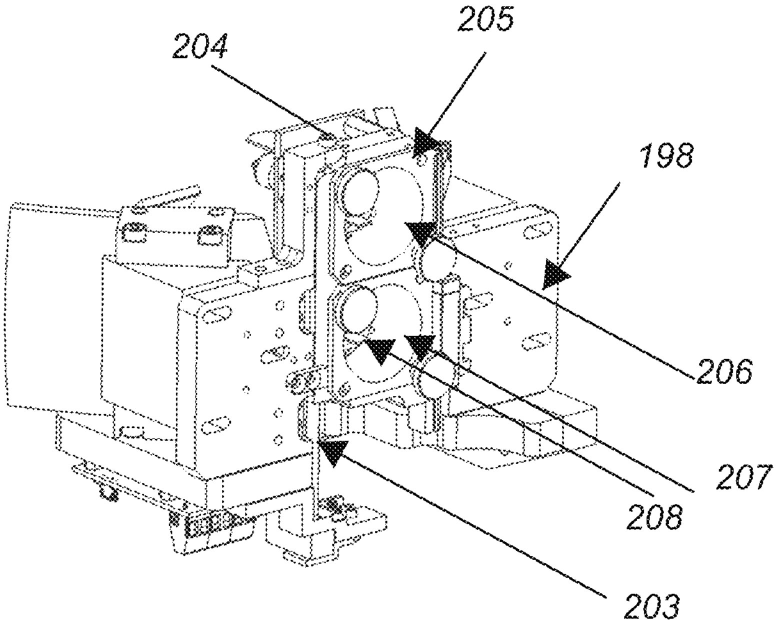
FIG. 8*b* shows the illumination arrangement shown in FIG. 8*a*, where the second illumination device is arranged in an active illumination position and the first illumination device is arranged in an in-active illumination position.

The arrangement shown in FIG. 8*b* is equal to the one shown in FIG. 8*a* except that in FIG. 8*a* the first illumination device is arranged in the active illumination position and the second illumination device is arranged in the first in-active illumination position; while in FIG. 8*b* the second illumination device is arranged in the active illumination position and the first illumination device is arranged in the second in-active illumination position.

FIG. 10 shows a front view of the irradiation arrangement 114 shown in FIG. 8*b* comprising a first partial parabolic mirror 199 and a second partial parabolic mirror, each partial parabolic mirror arranged on an opposite side of said first and second illumination device with respect to a centre line of said carrier.

Figure 5:
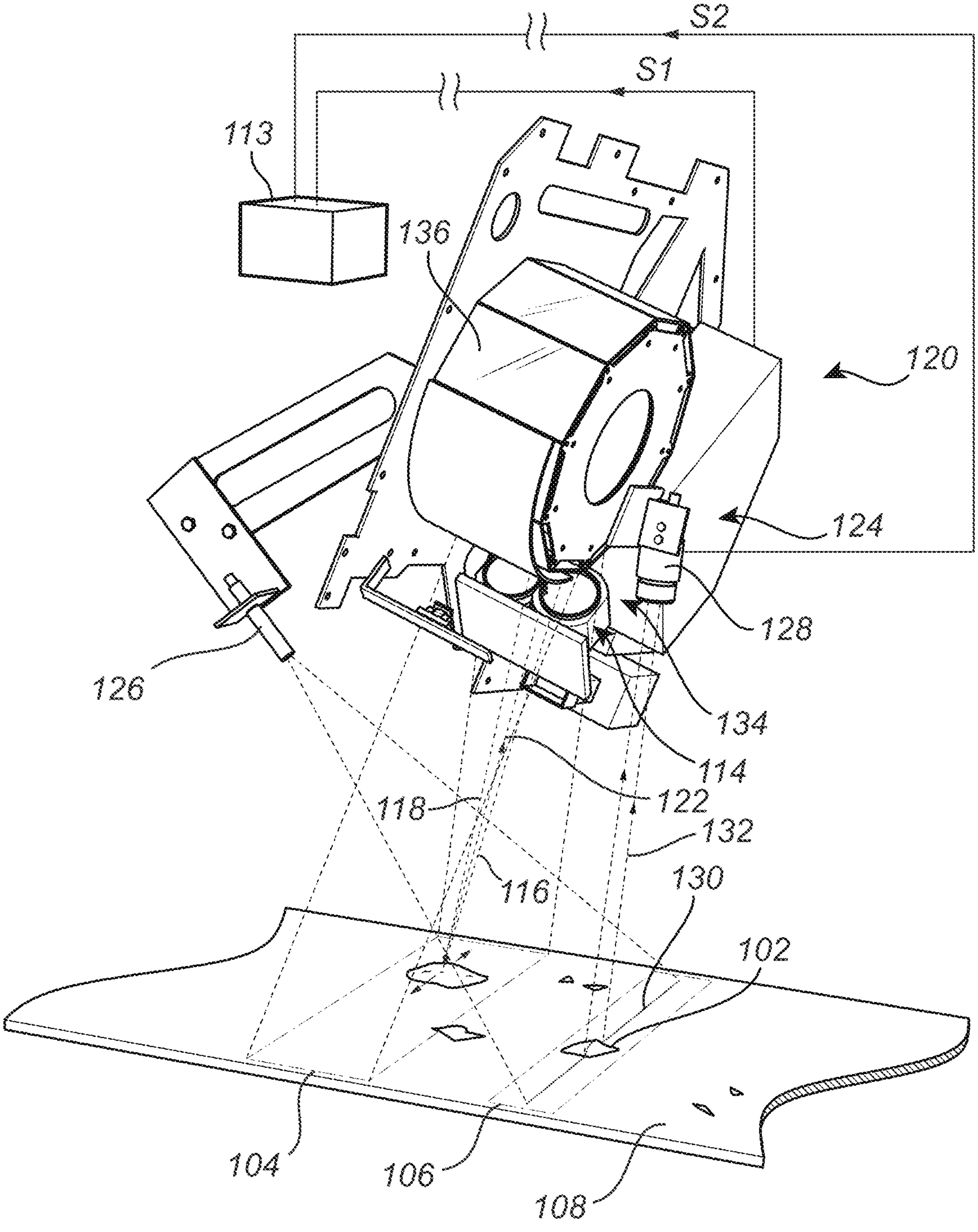
FIG. 5 is a schematic perspective detail view of a different setup that may be used in the apparatus of FIG. 1.

Now referring to FIG. 5, here is conceptually depicted a different setup of the components in the interior of the housing 110 of FIG. 1. FIG. 5 also illustrates a portion of the conveyor 108 including the first detection zone 104 and the second detection zone 106. The setup depicted in FIG. 5 is similar to that in FIG. 2. Hence, only relevant differences between FIG. 5 and FIG. 2. will be discussed to avoid undue repetition.

As can be seen in FIG. 5, the received optical radiation 122 of the spectroscopy system 120 intersects the line of laser light 130. Also, as can be seen in FIG. 5, the camera-based sensor arrangement 128 is viewing the second detection zone 106 on the conveyor 108 from above, i.e. in a normal direction with respect to the surface of the conveyor 108 and the laser arrangement 126 is inclined with respect to the surface of the conveyor 108, i.e. not normal to the surface of the conveyor 108. Hence, the line of laser light 130 impinges on the conveyor 108 in an angled fashion.

As discussed above in conjunction with FIG. 2, the position of matter 102 in the second detection zone 106 may be compensated for by taking the height or a varying height of the matter 102 into account when determining the position of the matter in the second detection zone 106. In other words, the processing unit 113 may compensate for the viewing angle of the camera-based sensor arrangement 128 with respect to the second detection zone 106 and hence with respect to the conveyor 108. In practice, the geometry of the laser arrangement 126 and the camera-based sensor arrangement 128 may be taken into account when determining the position of the matter in the second detection zone 106.

Figure 6:
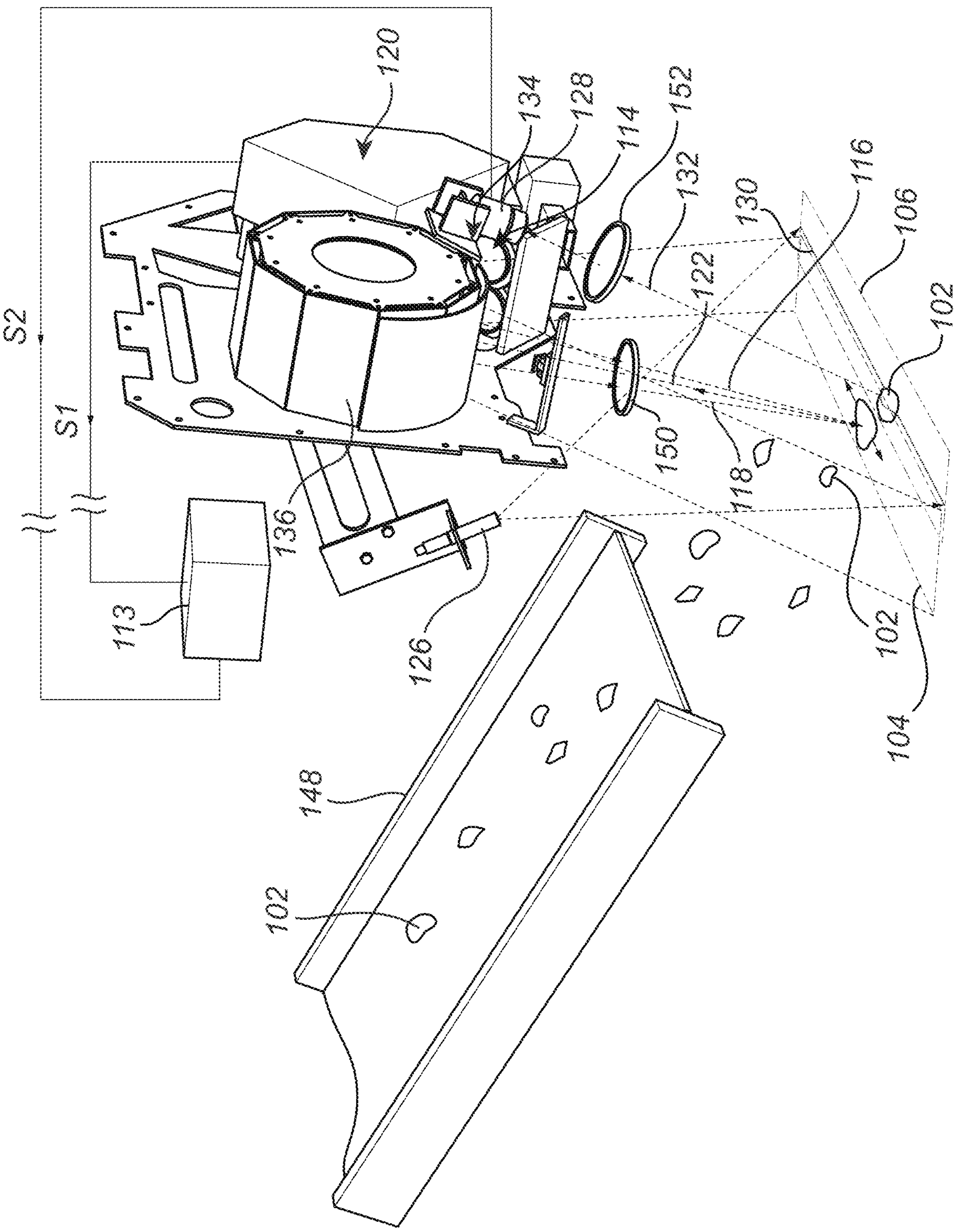
FIG. 6 is a schematic perspective detail view of a different setup where first and second detection zones overlap.

Now referring to FIG. 6, here is conceptually depicted a different setup of an apparatus largely corresponding to the apparatus 100 of FIG. 1. More specifically it is in FIG. 6. conceptually depicted a different setup of the components in the interior of the housing 110 of FIG. 1. FIG. 5 also illustrates how the conveyor 108 has been replaced by a chute 148. The setup depicted in FIG. 6 is to a large extent similar to that in FIG. 2. Hence, only relevant differences between FIG. 6 and FIG. 2. will be discussed to avoid undue repetition The depicted chute 148 is inclined such that the matter 102 is made to freefall of the chute 148 and through the first detection zone 104 and the second detection zone 106. The matter may alternatively be slid on the chute 148 through the first detection zone 104 and the second detection zone 106. The chute 148 may as an option include a vibration feeder for feeding the matter 102 onto the chute 148.

As can be seen in FIG. 6, the first detection zone 104 and the second detection zone 106 overlap. Hence, matter 102 provided through the first detection zone 104 and the second detection zone 106 will be present in the first detection zone 104 and the second detection zone 106 simultaneously. By the overlap of the first detection zone 104 and the second detection zone 106 it may be ascertained that measurements made by the spectroscopy system 120 and the laser triangulation system 124 may be correlated to the same piece of matter 102 in the respective detection zones. In other words, wrongful correlation of a particular piece of matter 102 may be counteracted.

When the first detection zone 104 and the second detection zone 106 overlap completely or partially, there is an outspoken risk that optical radiation originating from the irradiation arrangement 114 will reach the camera-based sensor arrangement 128 and disturb the same. Similarly, there is an outspoken risk that ambient optical radiation may reach the camera-based sensor arrangement 128 and disturb the same.

In order to reduce disturbances that may occur particularly when the first detection zone 104 and the second detection zone 106 overlap completely or partially, the apparatus 100 may be employed with one or more optical filters 150, 152 as depicted in FIG. 6.

In FIG. 6, a first optical filter 150 is arranged between the irradiation arrangement 114 and the first detection zone 104. More specifically, the depicted first optical filter 150 of FIG. 6 is located between the scanning element 136 and the first detection zone 104, i.e. in a location where the first set of illumination beams 116 and the second set of illumination beams 118 are scanned by the scanning element 136. The first optical filter 150 may for this reason have an elongated shape, such as a rectangular shape, along a scan direction.

The first optical filter 150 may advantageously be arranged at lens or exit window at the irradiation arrangement 114 or focusing arrangement 134.

The first optical filter 150 has optical properties that make the filter 150 counteract optical radiation originating from the first set of illumination beams 116 and the second set of illumination beams 118 from reaching the camera-based sensor arrangement 128.

In practice, the first optical filter 150 may block certain wavelengths of optical radiation originating from the first set of illumination beams 116 and the second set of illumination beams 118 while allowing other wavelengths to pass. Hence, the first optical filter 150 may block optical radiation originating the first set of illumination beams 116 and the second set of illumination beams 118 that otherwise would be detected by the camera-based sensor arrangement 128. In practice, the first optical filter 150 may block any optical radiation or a major portion of optical radiation having a wavelength below 900 nm. Hence, the first optical filter 150 may allow wavelengths in the NIR and IR ranges to pass. The wavelengths in the NIR and IR ranges is relevant for spectroscopy system 120 while not disturbing the camera-based sensor arrangement 128 or only disturbing the camera-based sensor arrangement 128 to a limited extent.

In FIG. 6, a second optical filter 152 is arranged between the second detection zone 106 and the camera-based sensor arrangement 128. The second optical filter 152 has optical properties that counteract passing of optical radiation 122 originating from the first set of illumination beams 116 and the second set of illumination beams 118. Also, the second optical filter 152 has optical properties that counteract passing of ambient optical radiation. Hence, a major portion of ambient optical radiation will be blocked by the second optical filter 152. Moreover, the second optical filter 152 has optical properties that allows passage of optical radiation originating from the line of laser light 130. Hence, the second optical filter 152 is typically a bandpass filter having a passband corresponding to the wavelength of the line of laser light 130. Hence, the arrangement of the second optical filter 152 may counteract undesired optical radiation that otherwise would risk disturbing the camera-based sensor arrangement 128 form reaching the same. For instance, is a red laser having a wavelength of 622 nm is utilised for providing the line of laser light 130, the second optical filter 152 may advantageously have a narrow passband around 622 nm so as to efficiently filter away almost all optical radiation not originating from the line of laser light 130. Hence, the passband of the second optical filter 152 is advantageously tailored to correspond to the wavelength or wavelengths of the line of laser light 130. Relevant bandpass filters for the second optical filter 152 are known in the art per se.

The person skilled in the art realizes that the present inventive concept by no means is limited to the preferred variants described above. On the contrary, many modifications and variations are possible within the scope of the appended claims.

For instance, the apparatus 100 may include a plurality of optical setups each including an irradiation arrangement 114, a spectroscopy system 120 and a laser triangulation system 124 as described above.

The optical setups may by arranged side by side over the width or a portion of the width of the conveyor 108 or chute 148. This means in practice that the width of the conveyor 108 or chute 148 may be covered by a plurality of first detection zones 106 and a plurality of second detection zones 108 of the above described type.

The optical setups may by arranged one after another along the conveyor 108 or chute 148. This means in practice that an extension along the conveyor 108 or chute 148 may be covered by a plurality of first detection zones 106 and a plurality of second detection zones 108 of the above described type.

The optical setups may by arranged side by side and one after the other. This means in practice that an extension along and across the conveyor 108 or chute 148 may be covered by a plurality of first detection zones 106 and a plurality of second detection zones 108 of the above described type.

The plurality of first detection zones 106 and second detection zones 108 may for instance partially overlap each other in a direction perpendicular to a flow direction of matter 102 being provided through the first detection zones 106 and second detection zones 108.

The plurality of first detection zones 106 and second detection zones 108 may for instance partially overlap each other in a direction along a flow direction of matter 102 being provided through the first detection zones 106 and second detection zones 108.

The plurality of first detection zones 106 and second detection zones 108 may for instance be arranged one after another and at the same time partially overlap each other in a direction perpendicular to a flow direction of matter 102 being provided through the first detection zones 106 and second detection zones 108.

The plurality of first detection zones 106 and second detection zones 108 may not physically overlap each other but still cover different portions of the width of the conveyor 108 or chute 148.

The plurality of first detection zones 106 and second detection zones 108 may for instance be arranged side by side and also partially overlap each other in a direction perpendicular to and/or along a flow direction of matter 102 provided through the first detection zones 106 and second detection zones 108.

Preferably, the plurality of optical setups is arranged in such a way, that upper surfaces or top surfaces of matter with large or maximum height can be detected across the complete conveyor 108 or chute 148.

If the plurality of second detection zones 108 overlap, the laser triangulation systems 124 of each optical setup may be adapted such that the plurality of second detection zones 108 do not interfere or only interfere to a limited extent. This may for instance be achieved by adapting the colours of the line of laser light 130 of each optical setup such that each optical setup uses a different colour of the line of laser light 130. Moreover, the first optical filter 150 and the second optical filter of each optical setup may be adapted to suit the irradiation arrangement 114, the spectroscopy system 120 and the laser triangulation system 124 of each optical setup, thereby further reducing interference between the plurality of second detection zones 108.

If the plurality of first detection zones 106 overlap, the irradiation arrangements 114 of each optical setup may be adapted such that the plurality of first detection zones 106 do not interfere or only interfere to a limited extent. This may for instance be achieved by adapting the irradiation arrangements 114 of each optical setup. The irradiation arrangements 114 of each optical setup may for this reason be synchronized. This means in practice that the first set of illumination beams 116 and the second set of illumination beams 118 of each optical setup may be synchronized so as to counteract interference therebetween. In other words, the first set of illumination beams 116 and the second set of illumination beams 118 of each optical setup may not reach the overlapping portions of the plurality of first detection zones 106 simultaneously.

Additionally, variations to the disclosed variants can be understood and effected by the skilled person in practicing the claimed invention, from a study of the drawings, the disclosure, and the appended claims. In the claims, the word “comprising” does not exclude other elements, and the indefinite article “a” or “an” does not exclude a plurality. The mere fact that certain measures are recited in mutually different dependent claims does not indicate that a combination of these measured cannot be used to advantage. Something that has been described as part of a whole, may also be used on its own.

Itemized List of Embodiments

Item 1. An apparatus (100) for detecting matter (102), the apparatus (100) comprising:

an irradiation arrangement (114), which comprises a first illumination device (201) adapted to emit a first set of illumination beams and a second illumination device (202) adapted to emit a second set of illumination beams, a scanning element (136), an optical arrangement, adapted to receive and direct at least one of said first and second sets of illumination beams towards said scanning element, wherein the scanning element (136) is configured to redirect only one of said first and second sets of illumination beams (116) towards a first detection zone (104) through which the matter (102) is provided, a detector system (120) including at least one sensor arrangement adapted to receive and analyse optical radiation (122) which optical radiation is reflected, emitted and/or scattered by matter (102) in the first detection zone (104), in response to said matter (102) being irradiated by one of said first and second set of illumination beams (116), a reference arrangement comprising a white reference element, which reference arrangement is adapted to receive optical radiation from at least one of said first illumination device and said second illumination device and adapted to direct said received optical radiation towards said detector system via said white reference element, and wherein said irradiation arrangement further comprises an active illumination position and a least one in-active illumination position, and an automated or semiautomated switching device (200) comprising:

a carrier (205) having a first receiving portion (206) for receiving and holding said first illumination device (201), and a second receiving portion (208) for receiving and holding said second illumination device (202), and wherein said carrier is movable between a first position, wherein said first receiving portion holds said first illumination device in said active illumination position and said second illumination device in one of said at least one in-active illumination position, and a second position wherein said first receiving portion holds said first illumination device in one of said at least one in-active illumination position and said second illumination device in said in active illumination position, and wherein said irradiation arrangement is configured to emit an illumination beam only from the one of said first and second illumination devices arranged in said active illumination position, guiding elements (203) configured to guide the movement of said carrier form said first position to said second position an actuator for physically moving said carrier form said first position to said second position based on the condition of said first illumination device and/or in response to a user-initiated input.

Item 2. An apparatus according to claim 1, wherein said irradiation arrangement (114) comprises a first in-active illumination position and a second in-active illumination position, said second illumination device is arranged in said first in-active illumination position when said carrier is arranged in said first position, said first illumination device is arranged in said second in-active illumination position when said carrier is arranged in said second position, and said active illumination position is arranged between said first and second in-active illumination positions in a direction (A) along said guiding element and/or wherein said guiding elements (203) is configured for guiding said carrier preferably along a substantially linear path from said first position to said second position, Item 3. An apparatus according to claim 2, wherein said switching device further comprises one or more guiding elements (203) for guiding said carrier along a substantially linear path from said first position to said second position and wherein said guiding element preferably comprises one or more guiding rails and at least one connector, wherein the at least one connector connects said carrier to said one or more guiding rails.

Item 4. An apparatus according to claim 2 or 3, wherein said switching device further comprises a positioning element (204) for preventing said actuator from moving said carrier beyond said second position.

Item 5. The apparatus (100) according to any one of the preceding claims, wherein the optical arrangement (100) further comprises a focusing arrangement (134), wherein the focusing arrangement (134) is adapted to direct and converge one of the first set of illumination beams (116) and the second set of illumination beams (118) towards the scanning element (136) and preferably focus said one of the first set of illumination beams (116) and the second set of illumination beams (118) in the vicinity of the first detection zone (104).

Item 6. The apparatus (100) according to any one of the preceding claims, wherein the detector system (120) comprises a first spectrometer system (120) adapted to analyse optical radiation of a first wavelength interval and optionally a second spectrometer system (120) adapted to analyse optical radiation of a second wavelength interval" and/or wherein the detector system (120) comprises a camera based detector system.

Item 7. An apparatus (100) according to claim 6, wherein the detector system comprises a which camera based detector system, which camera based detector system comprises a laser triangulation system (124) including:

a laser arrangement (126) adapted to emit a line of laser light (130) towards said first or a second detection zone (106) through which the matter (102) is provided, and a camera-based sensor arrangement (128) configured to receive and analyse light (132) which is reflected, emitted and/or scattered by matter (102) in the first or second detection zone (106), wherein the received light (132) of the camera-based sensor arrangement (128) originating from the line of laser light (130).

Item 8. The apparatus (100) according to any one of the preceding claims, the apparatus (100) further comprising a processing unit (113) coupled to the sensor system (120), wherein the processing unit (113) being configured to determine a first property set pertaining to matter (102) in the first detection zone (106) based on an outputted signal (S1) of the sensor system (120).

Item 9. The apparatus (100) according to claim 8, wherein the first property set is indicative of at least one of a spectral response of the matter (102), a material type of the matter (102), a colour of the matter (102), a fluorescence of the matter (102), a ripeness of the matter (102), a dry matter content of matter (102), a water content of the matter (102), a fat content of the matter (102), an oil content of the matter (102), a calorific value of the matter (102), a presence of bones or fishbones of the matter (102), a presence of pest of the matter (102), a mineral type of the matter (102), an ore type of the matter (102), a defect level of the matter (102), a detection of hazardous biological materials of the matter (102), a presence of matter (102), a non-presence of matter (102), a detection of multilayer materials of the matter (102), a detection of fluorescent markers of the matter (102), a detection of phosphorescent markers of the matter 102, a quality grade of the matter (102), a physical structure of the surface of the matter (102) and molecular structure of the matter (102).

Item 10. The apparatus (100) according to claim 8 or 9 when dependent on at least claim 7, wherein the second property set is indicative of at least one of a height of the matter (102), a height profile of the matter (102), a 3D map of the matter (102), an intensity profile of reflected, emitted and/or scattered light (132), a volume centre of the matter (102), an estimated mass centre of the matter (102), an estimated weight of the matter (102), an estimated material of the matter (102), a presence of matter (102), a non-presence of matter (102), a detection of isotropic and anisotropic light scattering of the matter (102), a structure and quality of wood, a surface roughness and texture of the matter (102) and an indication of presence of fluids in the matter (102).

Item 11. The apparatus according to any one of claims 8-10, the apparatus (100) further comprising an ejection arrangement (112) coupled to the processing unit (113), wherein the ejection arrangement (112) is adapted to eject and sort matter (102) into a plurality of fractions in response to receiving a signal form the processing unit (113) based on at least the determined first property set, the ejection arrangement (112) being adapted to eject and sort said matter (102) by means of at least one of a jet of compressed air, a jet of pressurized water, a mechanical finger, a bar of jets of compressed air, a bar of jets of pressurized water, a bar of mechanical fingers, a robotic arm and a mechanical diverter.

Item 12. The apparatus (100) according to any one of the preceding claims, the apparatus (100) further comprising, a conveyor (108) for conveying matter through the first detection zone (104) and the second detection zone (106) if present, or a chute (148), optionally including a vibration feeder, for sliding or freefalling of the matter through the first detection zone and/or the second detection zone if present.

Item 13. A method for operating an apparatus (100) for detecting matter (102), the apparatus (100) comprising:

an irradiation arrangement (114), which comprises a first illumination device adapted to emit a first set of illumination beams (116*a*) and a second illumination device adapted to emit a second set of illumination beams (116*b*), a scanning element, an optical arrangement, adapted to receive and direct at least one of said first and second sets of illumination beams towards said scanning element, wherein the scanning element is configured to redirect said at least one of said first and second sets of illumination beams towards a first detection zone (104) through which the matter (102) is provided, a detector system (120) including at least one sensor arrangement adapted to receive and analyse optical radiation (122) which optical radiation is reflected, emitted and/or scattered by matter (102) in the first detection zone (104), in response to said matter (102) being irradiated by at least one of said first and second set of illumination beams, a reference arrangement comprising a white reference element, which reference arrangement is adapted to receive optical radiation from at least one of said first illumination device and said second illumination device and to direct said received optical radiation towards said detector system via said white reference element, which reference arrangement is arranged up stream of said scanning element comprising the steps of:

arranging said first illumination device in an active illumination position and said second illumination device in an in-active illumination position, emitting a first set of illumination beams from said first illumination device towards said first scanning element, based on the condition of said first illumination device and/or in response to a user-initiated input initiating a automated or semiautomated switching event wherein said first illumination device is moved to an in-active illumination position and said second illumination device is moved to said active illumination position, wherein said first and second illumination devices are preferably moved simultaneously to the respective one of an in-active illumination position and an active illumination position, wherein said irradiation arrangement is configured to emit an illumination beam only from the one of said first and second illumination devices arranged in said active illumination position.

The invention claimed is:

1. An apparatus for detecting matter, the apparatus comprising:

an irradiation arrangement, which comprises a first illumination device adapted to emit a first set of illumination beams and a second illumination device adapted to emit a second set of illumination beams, wherein each one of said first and second illumination devices is selected from a group comprising halogen illumination devices, Xenon arc illumination devices and LED illumination devices, a scanning element, an optical arrangement, adapted to receive and direct at least one of said first and second sets of illumination beams towards said scanning element, wherein the scanning element is configured to redirect only one of said first and second sets of illumination beams towards a first detection zone through which the matter is provided, a detector system including at least one sensor arrangement adapted to receive and analyse optical radiation which optical radiation is reflected, emitted and/or scattered by matter in the first detection zone, in response to said matter being irradiated by one of said first and second set of illumination beams, a reference arrangement comprising a white reference element, which reference arrangement is adapted to receive optical radiation from at least one of said first illumination device and said second illumination device and adapted to direct said received optical radiation towards said detector system via said white reference element, and wherein said irradiation arrangement further comprises an active illumination position and a least one in-active illumination position, and an automated or semiautomated switching device comprising:

a carrier having a first receiving portion for receiving and holding said first illumination device, and a second receiving portion for receiving and holding said second illumination device, and wherein said carrier is movable between a first position, wherein said first receiving portion holds said first illumination device in said active illumination position and said second receiving portion holds said second illumination device in one of said at least one in-active illumination position, and a second position wherein said first receiving portion holds said first illumination device in one of said at least one in-active illumination position and said second receiving portion holds said second illumination device in said active illumination position, and wherein said irradiation arrangement is configured to emit an illumination beam only from the one of said first and second illumination devices arranged in said active illumination position, and wherein said one of said at least one in-active illumination position is configured to allow for exchanging of one of said first and second illumination devices during operation of an other of said first and second illumination devices in said active illumination position, guiding elements configured to guide the movement of said carrier from said first position to said second position, wherein said guiding element comprises one or more pairs of guiding rails, an actuator for physically moving said carrier from said first position to said second position based on the condition of said first illumination device and/or in response to a user-initiated input, and a positioning element for preventing said actuator from moving said carrier beyond said first and/or second position.

2. The apparatus according to claim 1, wherein said irradiation arrangement comprises a first in-active illumination position and a second in-active illumination position, said second illumination device is arranged in said first in-active illumination position when said carrier is arranged in said first position, said first illumination device is arranged in said second in-active illumination position when said carrier is arranged in said second position, and said active illumination position is arranged between said first and second in-active illumination positions in a direction (A) along said guiding elements, and/or wherein said guiding elements are configured for guiding said carrier along a linear path from said first position to said second position.

3. The apparatus according to claim 2, wherein said switching device further comprises one or more guiding elements for guiding said carrier along a linear path from said first position to said second position and wherein said guiding element further comprises at least one connector, wherein the at least one connector connects said carrier to said one or more pairs of guiding rails.

4. The apparatus according to claim 2, wherein said guiding elements further comprises a frame that circumvents the carrier, where two sides of the guiding frame extends in direction A and form said one or more pairs of guiding rails, and wherein remaining sides of the frames, not extending in direction A form positioning elements for preventing said actuator from moving said carrier beyond said second and first position respectively.

5. The apparatus according to claim 1, wherein the optical arrangement further comprises a focusing arrangement, wherein the focusing arrangement is adapted to direct and converge one of the first set of illumination beams and the second set of illumination beams towards the scanning element and focus said one of the first set of illumination beams and the second set of illumination beams towards the first detection zone.

6. The apparatus according to claim 1, wherein the detector system comprises a first spectrometer system adapted to analyse optical radiation of a first wavelength interval and a second spectrometer system adapted to analyse optical radiation of a second wavelength interval and/or wherein the detector system comprises a camera based detector system.

7. The apparatus according to claim 6, wherein the detector system comprises a camera based detector system, which camera based detector system comprises a laser triangulation system including:

a laser arrangement adapted to emit a line of laser light towards said first or a second detection zone through which the matter is provided, and a camera-based sensor arrangement configured to receive and analyse light which is reflected, emitted and/or scattered by matter in the first or second detection zone, wherein the received light of the camera-based sensor arrangement originating from the line of laser light.

8. The apparatus according to claim 1, the apparatus further comprising a processing unit coupled to the detector system, wherein the processing unit being configured to determine a first property set pertaining to matter in the first detection zone based on an outputted signal of the detector system.

9. The apparatus according to claim 8, wherein the first property set is indicative of at least one of a spectral response of the matter, a material type of the matter, a colour of the matter, a fluorescence of the matter, a ripeness of the matter, a dry matter content of matter, a water content of the matter, a fat content of the matter, an oil content of the matter, a calorific value of the matter, a presence of bones or fishbones of the matter, a presence of pest of the matter, a mineral type of the matter, an ore type of the matter, a defect level of the matter, a detection of hazardous biological materials of the matter, a presence of matter, a non-presence of matter, a detection of multilayer materials of the matter, a detection of fluorescent markers of the matter, a detection of phosphorescent markers of the matter, a quality grade of the matter, a physical structure of the surface of the matter and molecular structure of the matter.

10. The apparatus according to claim 8, wherein the detector system comprises a camera based detector system, which camera based detector system comprises a laser triangulation system including:

a laser arrangement adapted to emit a line of laser light towards said first or a second detection zone through which the matter is provided, and a camera-based sensor arrangement configured to receive and analyse light which is reflected, emitted and/or scattered by matter in the first or second detection zone, wherein the received light of the camera-based sensor arrangement originating from the line of laser light, wherein a second property set is indicative of at least one of a height of the matter, a height profile of the matter, a 3D map of the matter, an intensity profile of reflected, emitted and/or scattered light, a volume centre of the matter, an estimated mass centre of the matter, an estimated weight of the matter, an estimated material of the matter, a presence of matter, a non-presence of matter, a detection of isotropic and anisotropic light scattering of the matter, a structure and quality of wood, a surface roughness and texture of the matter and an indication of presence of fluids in the matter.

11. The apparatus according to claim 8, the apparatus further comprising an ejection arrangement coupled to the processing unit, wherein the ejection arrangement is adapted to eject and sort matter into a plurality of fractions in response to receiving a signal form the processing unit based on at least the determined first property set, the ejection arrangement being adapted to eject and sort said matter by means of at least one of a jet of compressed air, a jet of pressurized water, a mechanical finger, a bar of jets of compressed air, a bar of jets of pressurized water, a bar of mechanical fingers, a robotic arm and a mechanical diverter.

12. The apparatus according to claim 1, the apparatus further comprising, a conveyor for conveying matter through the first detection zone and a second detection zone if present, or a chute including a vibration feeder, for sliding or freefalling of the matter through the first detection zone and/or the second detection zone if present.

13. A method for operating an apparatus for detecting matter, the apparatus comprising:

an irradiation arrangement, which comprises a first illumination device adapted to emit a first set of illumination beams and a second illumination device adapted to emit a second set of illumination beams, wherein each one of said first and second illumination devices is selected from a group comprising halogen illumination devices, Xenon arc illumination devices and LED illumination devices, a scanning element, an optical arrangement, adapted to receive and direct at least one of said first and second sets of illumination beams towards said scanning element, wherein the scanning element is configured to redirect said at least one of said first and second sets of illumination beams towards a first detection zone through which the matter is provided, a detector system including at least one sensor arrangement adapted to receive and analyse optical radiation which optical radiation is reflected, emitted and/or scattered by matter in the first detection zone, in response to said matter being irradiated by at least one of said first and second set of illumination beams, a reference arrangement comprising a white reference element, which reference arrangement is adapted to receive optical radiation from at least one of said first illumination device and said second illumination device and to direct said received optical radiation towards said detector system via said white reference element, which reference arrangement is arranged up stream of said scanning element comprising the steps of:

arranging said first illumination device in an active illumination position and said second illumination device in an in-active illumination position, emitting a first set of illumination beams from said first illumination device towards said first scanning element, based on the condition of said first illumination device and/or in response to a user-initiated input initiating an automated or semiautomated switching event wherein said first illumination device is moved to an in-active illumination position and said second illumination device is moved to said active illumination position, wherein said first and second illumination devices are moved simultaneously to the respective one of an in-active illumination position and an active illumination position, wherein said irradiation arrangement is configured to emit an illumination beam only from the one of said first and second illumination devices arranged in said active illumination position, and wherein said in-active illumination position is configured to allow for exchanging of one of said first and second illumination devices during operation of an other of said first and second illumination devices in the active illumination position, preventing an actuator from moving said first and second illumination devices within one or more pairs of guiding rails beyond a first and/or a second position, by means of at least one positioning element.

* * * * *